US009110512B2

(12) United States Patent
Exner

(10) Patent No.: US 9,110,512 B2
(45) Date of Patent: Aug. 18, 2015

(54) INTERACTIVE INPUT SYSTEM HAVING A 3D INPUT SPACE

(75) Inventor: Andrew Michael Exner, Calgary (CA)

(73) Assignee: SMART Technologies ULC, Calgary (CA)

( * ) Notice: Subject to any disclaimer, the term of this patent is extended or adjusted under 35 U.S.C. 154(b) by 631 days.

(21) Appl. No.: 13/436,603

(22) Filed: Mar. 30, 2012

(65) Prior Publication Data

US 2012/0249762 A1 Oct. 4, 2012

Related U.S. Application Data

(60) Provisional application No. 61/470,409, filed on Mar. 31, 2011.

(51) Int. Cl.
*H04N 7/18* (2006.01)
*G06F 3/01* (2006.01)
*G06F 3/03* (2006.01)

(52) U.S. Cl.
CPC .............. *G06F 3/017* (2013.01); *G06F 3/0304* (2013.01)

(58) Field of Classification Search
CPC ... G06K 9/00; G06K 9/00671; G06K 9/3216; G06K 9/3241; H04N 1/00326; H04N 1/00411; G06F 3/04815; G06T 19/006; G06T 2207/30204
USPC .......................................................... 348/61
See application file for complete search history.

(56) References Cited

U.S. PATENT DOCUMENTS

2005/0289590 A1* 12/2005 Cheok et al. ..................... 725/37
2012/0015672 A1* 1/2012 Jung ........................... 455/456.3

FOREIGN PATENT DOCUMENTS

WO 2011/085486 A1 7/2011
WO 2012/009789 A2 1/2012

OTHER PUBLICATIONS

Gun A. Lee et al., "Occlusion based Interaction Methods for Tangible Augmented Reality Environments", Proceedings of the 2004 ACM SIGGRAPH International conference on Virtual Reality continuum and its applications in industry, pp. 419-426, 2004.

* cited by examiner

*Primary Examiner* — Mehrdad Dastouri
*Assistant Examiner* — Obafemi Sosanya
(74) *Attorney, Agent, or Firm* — Katten Muchin Rosenman LLP

(57) ABSTRACT

An interactive input system comprises computing structure; and an input device detecting at least one electronic device displaying a recognizable pattern within a three-dimensional (3D) input space and providing output to the computing structure. The computing structure processes the output of the input device to recognize the pattern displayed by the at least one electronic device in the 3D input space; detect the state of the at least one electronic device; and modify image data by applying a transition to digital content associated with the displayed pattern based on the detected state of the at least one electronic device.

20 Claims, 22 Drawing Sheets

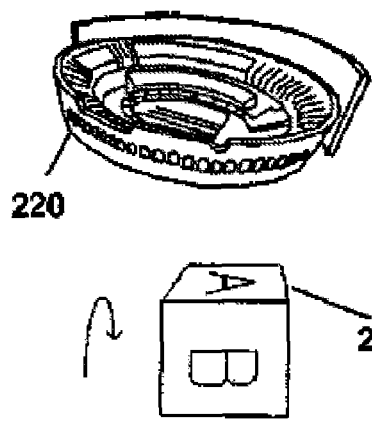 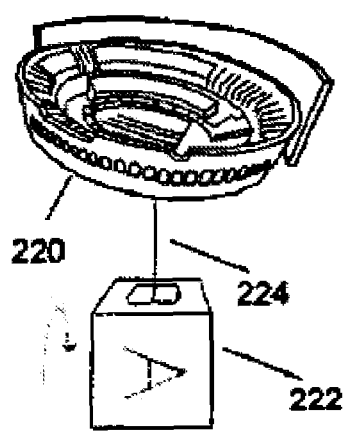 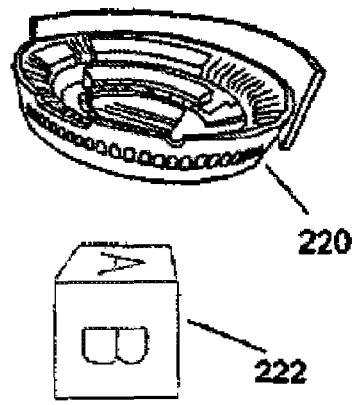
FIG. 5A  FIG. 5B  FIG. 5C
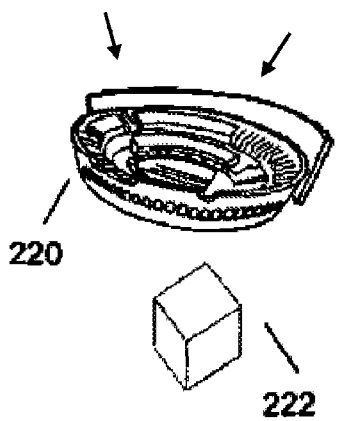 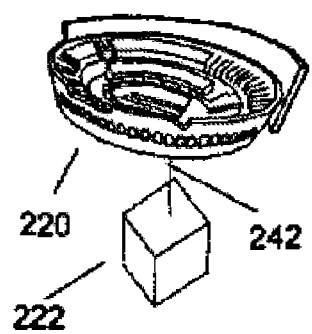 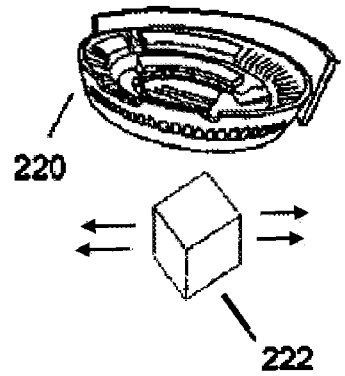
FIG. 6A  FIG. 6B  FIG. 6C
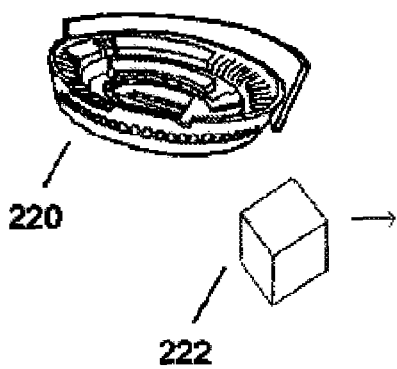
FIG. 6D

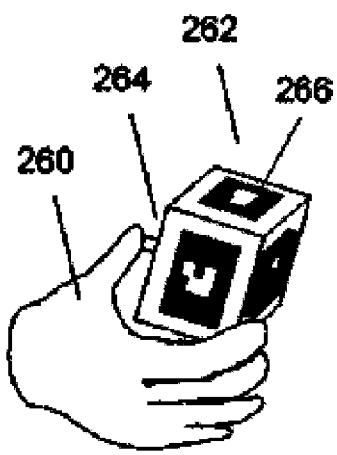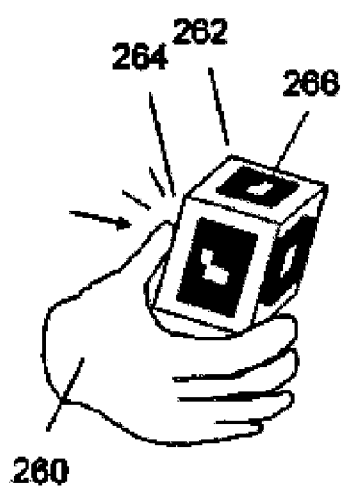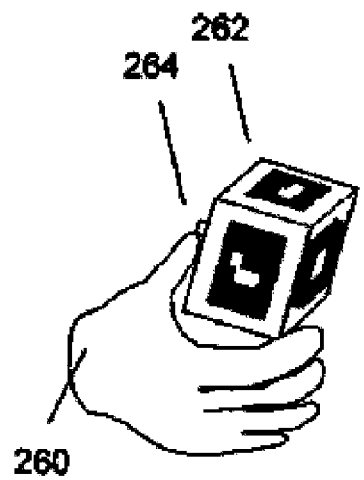
FIG. 7A   FIG. 7B   FIG. 7C
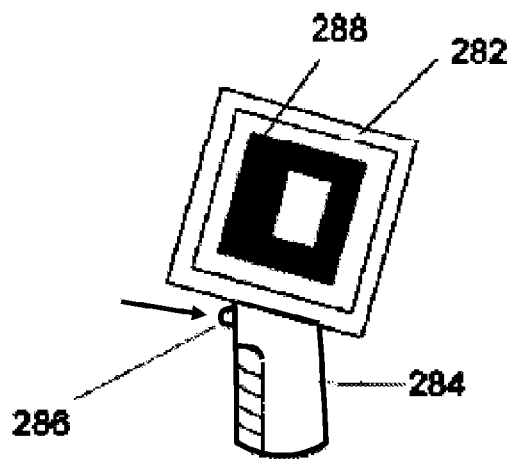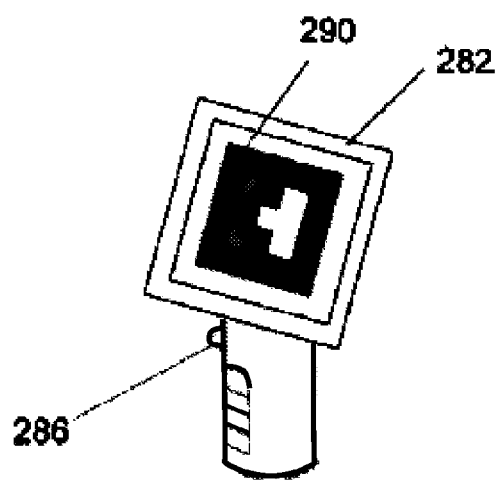
FIG. 8A   FIG. 8B

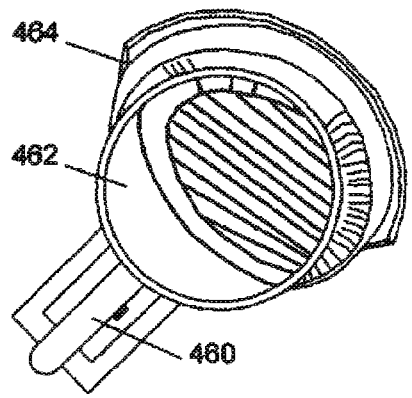
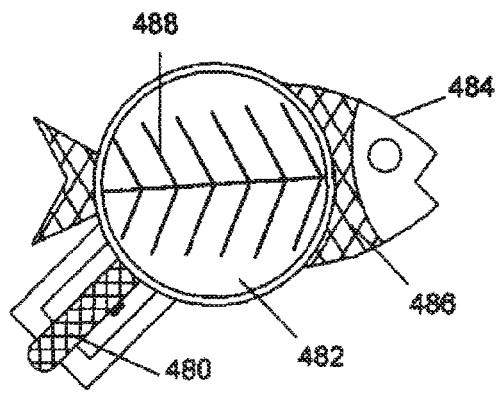
FIG. 12A  FIG. 12B
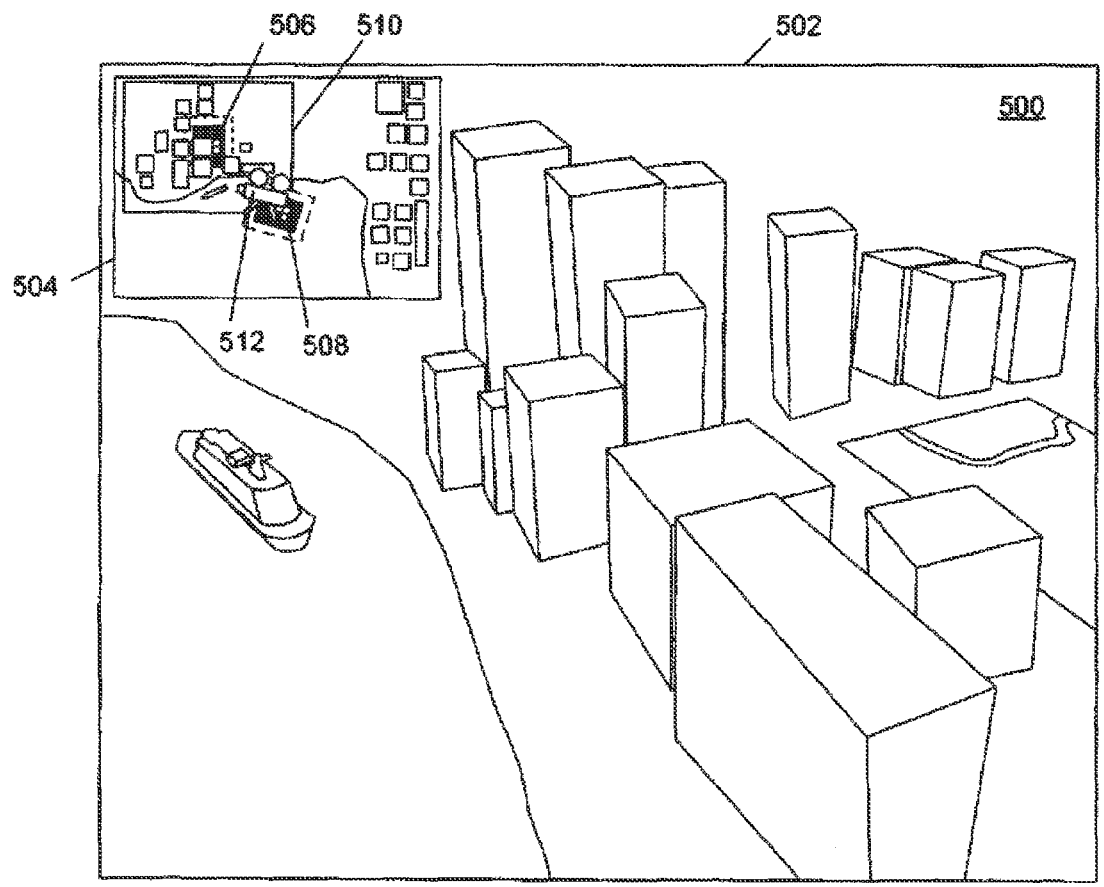
FIG. 13

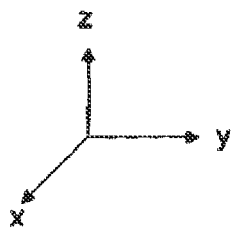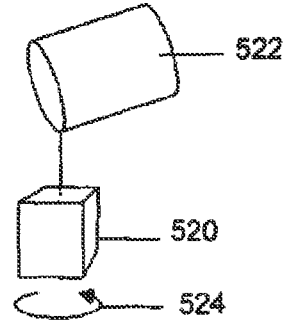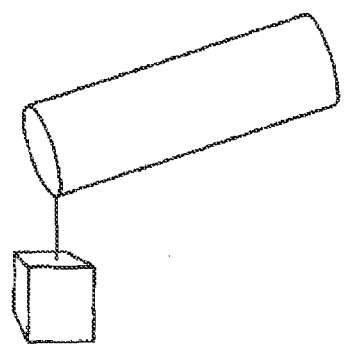
FIG. 14A  FIG. 14B  FIG. 14C
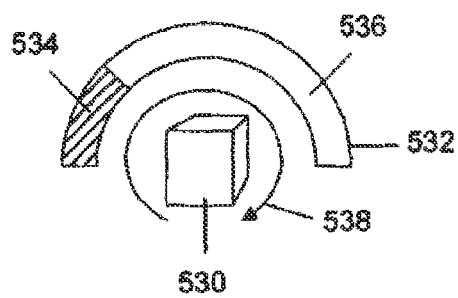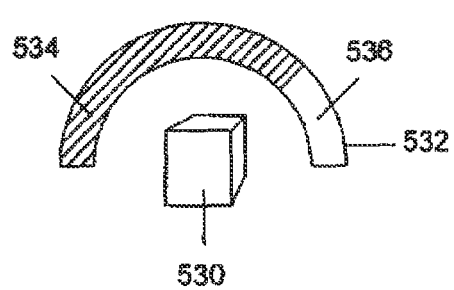
FIG. 14D  FIG. 14E
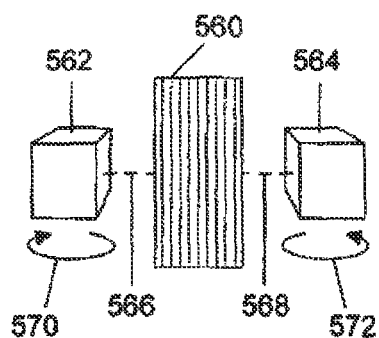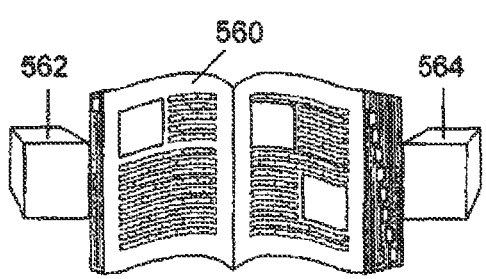
FIG. 15A  FIG. 15B

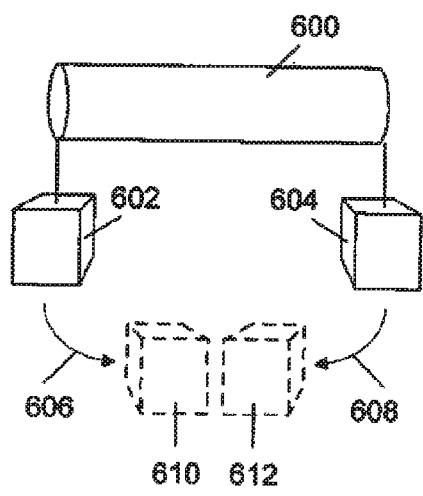
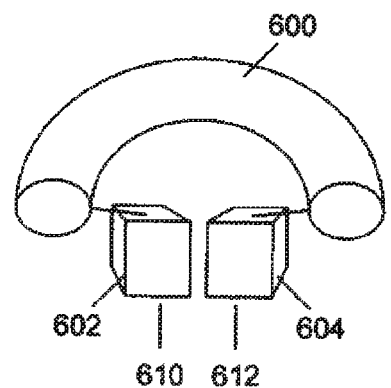
FIG. 16A  FIG. 16B
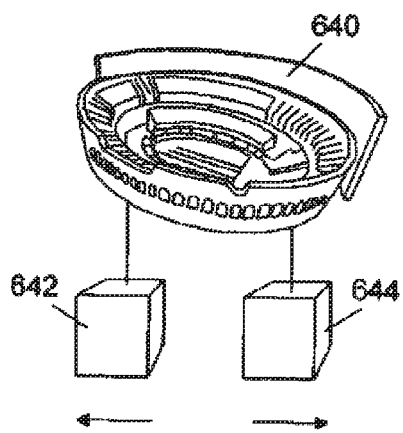
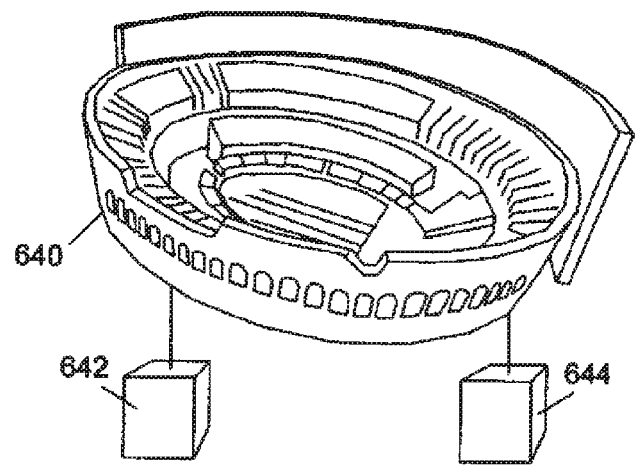
FIG. 17A  FIG. 17B

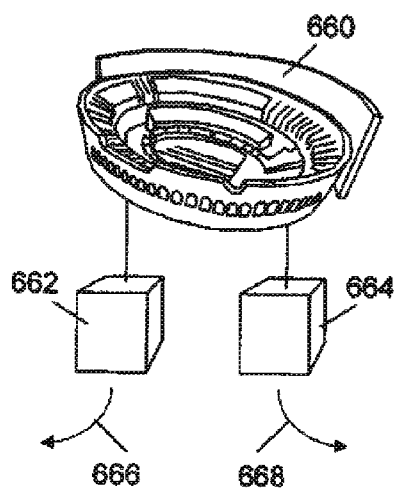 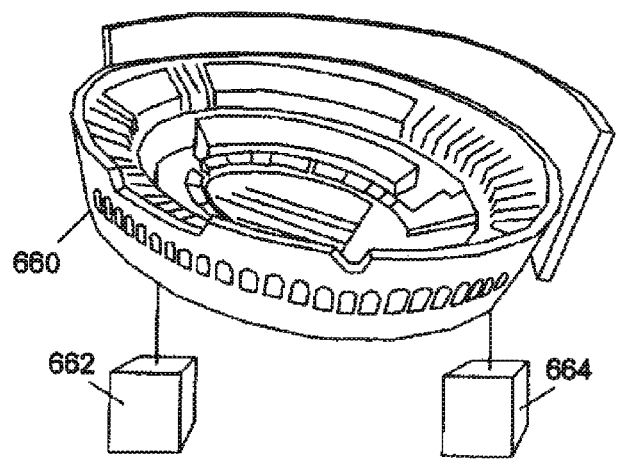
FIG. 18A  FIG. 18B
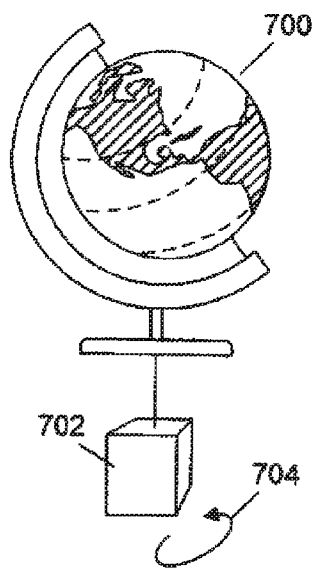 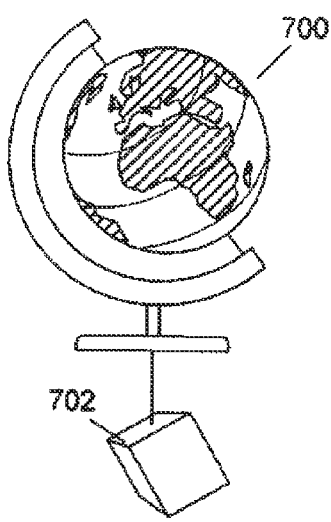
FIG. 19A  FIG. 19B

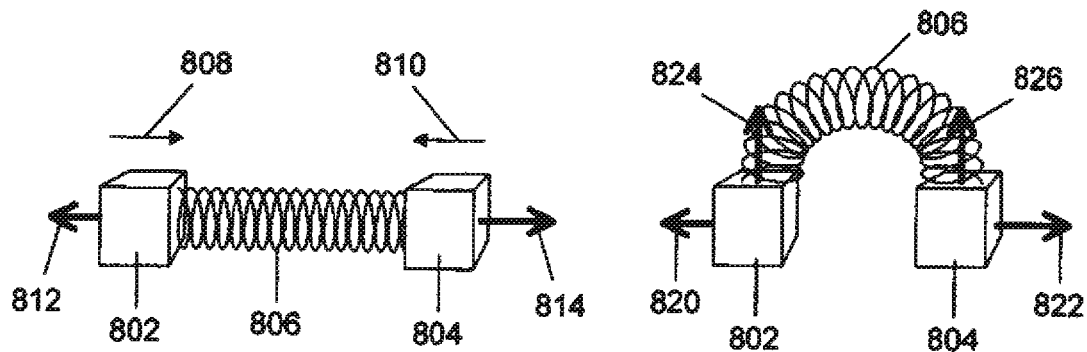
FIG. 22A  FIG. 22B
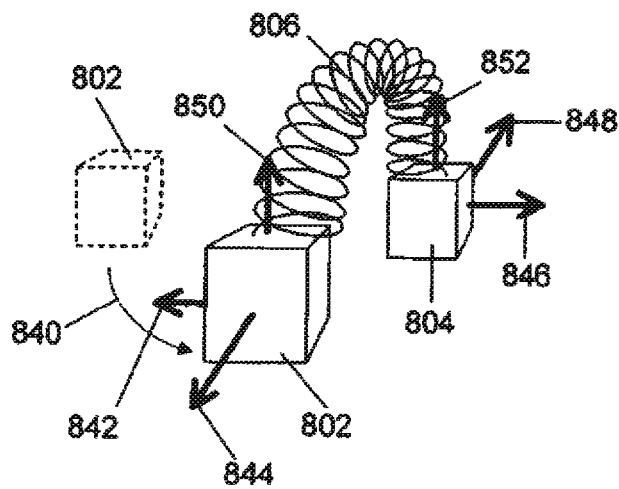
FIG. 22C
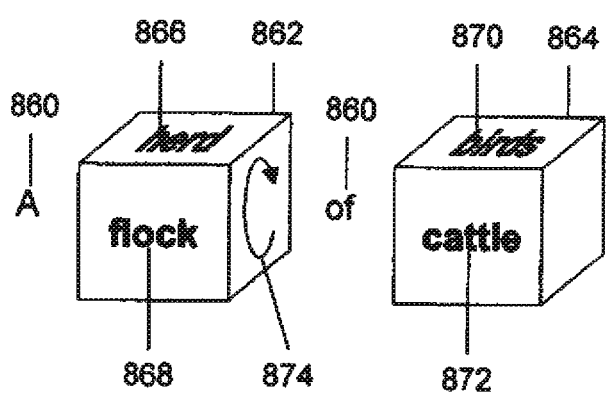
FIG. 23

INTERACTIVE INPUT SYSTEM HAVING A 3D INPUT SPACE

CROSS-REFERENCE TO RELATED APPLICATIONS

This application claims the benefit of U.S. Provisional Application No. 61/470,409 to Exner filed on Mar. 31, 2011 for an invention entitled "Interactive Input System Having A 3D Input Space", the entire content of which is incorporated herein by reference.

FIELD OF THE INVENTION

The present invention generally relates to interactive input systems and in particular, to an interactive input system having a three-dimensional (3D) input space and to 3D tools and gestures for interacting in mixed reality environments.

BACKGROUND OF THE INVENTION

Mixed reality or augmented interactive input systems are known in the art. Some existing augmented interactive input systems make use of a document camera to track physical objects such as cubes and flashcards that comprise recognizable patterns. Digital content is superimposed on top of the images captured by the document camera. The direct association of the physical objects to digital content allows users to manipulate the digital content through manipulation of the physical objects. Unfortunately, these augmented interactive input systems have only permitted the position and orientation of physical objects to be tracked. As a result, user manipulations of digital content in this scenario have been limited to translations and rotations of physical objects. By only permitting the position and orientation of the physical objects to be tracked, interactions such as clicking a button or opening a menu have been difficult to realize without use of an external input device such as a mouse or keyboard.

Another problem that occurs in existing augmented interactive input systems is the temporary loss of physical objects that are being tracked. When an augmented interactive input system loses track of a physical object and then regains tracking of the physical object, the associated digital content shown on the display disappears and then quickly re-appears, causing unwanted flickering.

Another problem with these augmented interactive input systems is that they generally employ physical markers, such as, paper-based markers, which are difficult to identify under poor ambient lighting conditions. Additionally, proper identification of the marker may be severely affected by light reflecting off of the surface of the marker, or by shadows or other occlusions of portions of the marker.

The publication entitled "Occlusion based Interaction Methods for Tangible Augmented Reality Environments," authored by Lee et al. and published in the Proceedings of the 2004 ACM SIGGRAPH international conference on Virtual Reality continuum and its applications in industry (pages 419-426, 2004), discloses an occlusion based interaction system and method for interacting with two-dimensional (2D) digital objects in a camera-based tangible augmented reality environment. A marker comprising a set of patterns is imaged by a camera, and patterns on the marker are recognized. When a user uses a finger to manipulate the marker and the finger occludes at least one pattern on the marker, the interaction system determines which pattern has been occluded, and then performs a 2D action (e.g., clicking a button or opening a menu) accordingly. Because multiple patterns are required, either the marker has to be sufficiently large so as to accommodate the patterns, making the marker, as a physical object, difficult to manipulate, or the patterns have to be small, which may increase the failure rate of pattern recognition.

As will be appreciated, improvements in mixed reality or augmented interactive input systems are desired. It is therefore an object of the following to provide a novel interactive input system having a three-dimensional input space.

SUMMARY OF THE INVENTION

Accordingly, in one aspect there is provided an interactive input system comprising computing structure; and an input device detecting at least one electronic device displaying a recognizable pattern within a three-dimensional (3D) input space and providing output to said computing structure, wherein said computing structure processes the output of the input device to recognize the pattern displayed by the at least one electronic device in the 3D input space; detect the state of the at least one electronic device; and modify image data by applying a transition to digital content associated with the displayed pattern based on the detected state of the at least one electronic device.

According to another aspect there is provided an interactive input system comprising computing structure; and an input device detecting at least one electronic device displaying a recognizable pattern within a three-dimensional (3D) input space and providing output to said computing structure, wherein said computing structure processes the output of the input device to recognize the pattern displayed by the at least one electronic device in the 3D input space; determine when the location of the pattern within the 3D input space and the location of digital content in an image presented on a display surface satisfy defined criteria; and associate the pattern to the digital content.

According to another aspect there is provided an apparatus comprising a processing device receiving data representing an electronic device displaying a recognizable pattern positioned within a three-dimensional (3D) input space; and memory storing computer program code executable by the processing device, the processing device communicating with the memory and executing the program code and causing the apparatus at least to recognize the pattern carried by the electronic device in the 3D input space; determine when the location of the pattern within the 3D input space and the location of digital content in an image presented on a display surface satisfy defined criteria; and associate the pattern to the digital content.

According to still yet another aspect there is provided a method comprising detecting a unique pattern displayed by an electronic device positioned within a three-dimensional input space; determining when the pattern is positioned within the input space at a location within a threshold distance of a location corresponding to digital content within a presented image; and associating the pattern to the digital content so that manipulation of the electronic device within the input spaces manipulates the digital content.

Advantageously, data representing a plurality of recognizable patterns can be stored locally in digital libraries on the electronic device, or accessed remotely via communication networks, and such libraries can be easily and rapidly accessed, and searched. Furthermore, use of the electronic device to display the patterns does not exhibit problems associated with paper-based markers, such as, legibility issues due to lighting conditions, wear and tear, etc.

BRIEF DESCRIPTION OF THE DRAWINGS

Embodiments will now be described more fully with reference to the accompanying drawings in which:

FIGS. 5A to 5C illustrate a content selection technique that selects digital content in response to rotation of a physical object in the 3D input space;

FIGS. 6A to 6D illustrate an alternative content selection technique that selects digital content by attracting digital content to a physical object in the 3D input space;

FIGS. 7A to 7C illustrate yet another content selection technique that selects digital content in response to a cube-shaped physical object having liquid crystal display (LCD) panels in the 3D input space;

FIGS. 8A and 8B illustrate still yet another content selection technique that selects digital content in response to a physical object having an LCD panel and a handle in the 3D input space;

FIG. 12A illustrates manipulation of a physical object in the 3D input space to zoom in on a portion of digital content;

FIG. 12B illustrates manipulation of a physical object in the 3D input space to expose a second layer of digital content;

FIG. 13 illustrates manipulation of two physical objects in the 3D input space to view a portion of digital content;

FIGS. 14A to 14E illustrate a rotation method for modifying characteristics of digital content based on the rotation axis of a physical object in the 3D input space;

FIGS. 15A and 15B illustrate an alternative rotation method for opening an ebook in response to rotation of two physical objects in the 3D input space;

FIGS. 16A and 16B illustrate manipulation of two physical objects in the 3D input space to bend digital content;

FIGS. 17A and 17B illustrate manipulation of two physical objects in the 3D input space to zoom digital content;

FIGS. 18A to 19B show examples where restrictions are applied when manipulating digital content using physical objects in the 3D input space;

FIGS. 22A to 22C show an example of a mixed reality application for illustrating physics principles by manipulating two physical objects in the 3D input space;

FIG. 23 shows a method of manipulating a physical object in the 3D input space to answer a question.

DETAILED DESCRIPTION OF THE EMBODIMENTS

Figure 1A:
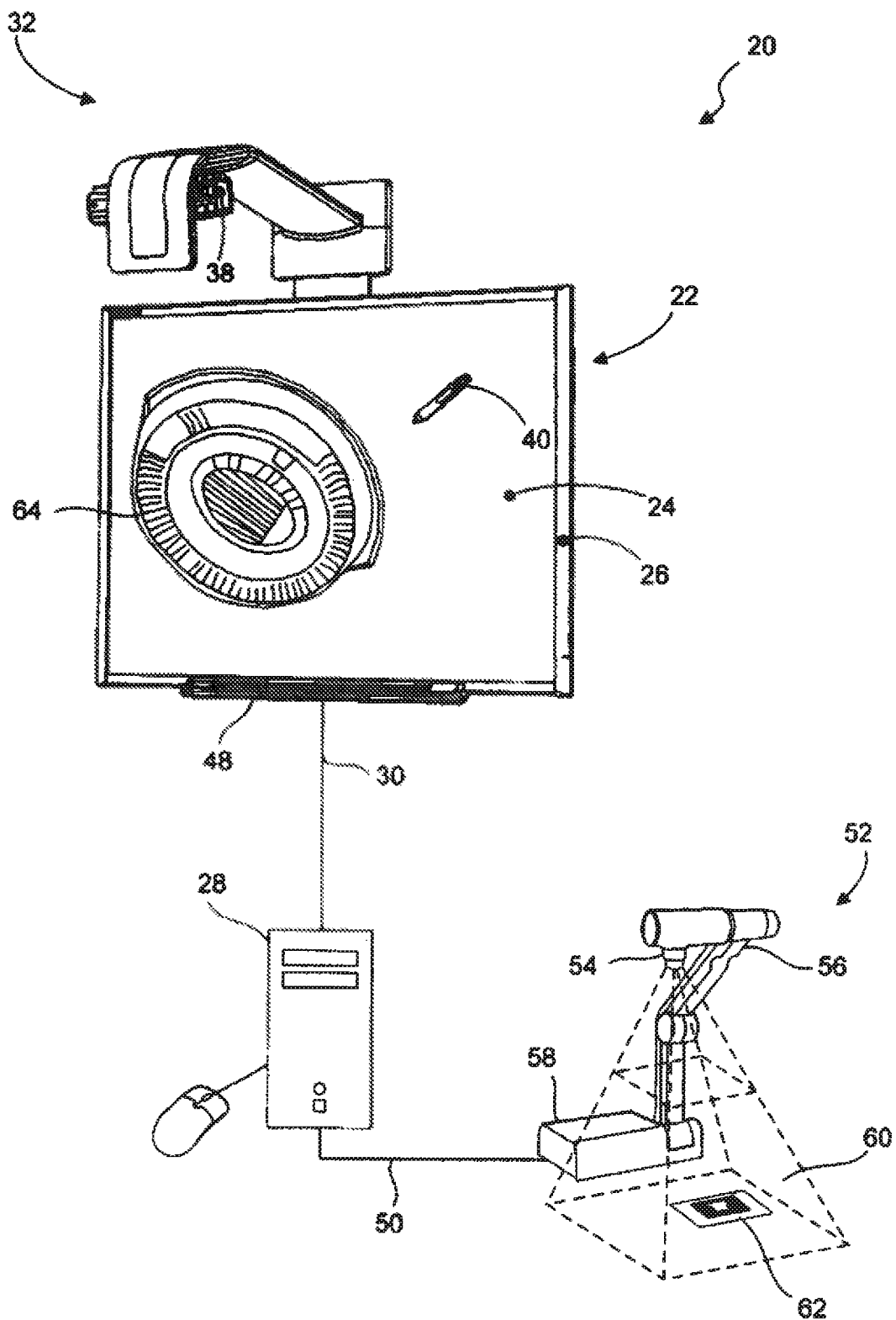
FIG. 1A is a partial perspective, schematic diagram of an interactive input system having a three-dimensional (3D) input space.

Turning now to FIG. 1A, an interactive input system having a three-dimensional (3D) input space is shown and is generally identified by reference numeral 20. Interactive input system 20 allows a user to inject input such as digital ink, mouse events, commands, etc. into an executing application program. In this embodiment, interactive input system 20 comprises a two-dimensional (2D) input device in the form of an interactive board 22 mounted on a vertical support surface such as for example, a wall surface or the like. Interactive board 22 comprises a generally planar, rectangular interactive surface 24 that is surrounded about its periphery by a bezel 26. A boom assembly 32 is also mounted on the support surface above the interactive board 22. Boom assembly 32 supports a short-throw projector 38 such as that sold by SMART Technologies ULC of Calgary, Alberta, assignee of the subject application, under the name "SMART Unifi 45", which projects an image, such as for example, a computer desktop, onto the interactive surface 24.

The interactive board 22 employs machine vision to detect one or more pointers brought into a region of interest in proximity with the interactive surface 24. The interactive board 22 communicates with a general purpose computing device 28 executing one or more application programs via a universal serial bus (USB) cable 30 or other suitable wired or wireless communication link. Computing device 28 processes the output of the interactive board 22 and adjusts image data that is output to the projector 38, if required, so that the image presented on the interactive surface 24 reflects pointer activity. In this manner, the interactive board 22, computing device 28 and projector 38 allow pointer activity proximate to the interactive surface 24 to be recorded as writing or drawing or used to control execution of one or more application programs executed by the computing device 28.

The bezel 26 is mechanically fastened to the interactive surface 24 and comprises four bezel segments that extend along the edges of the interactive surface 24. In this embodiment, the inwardly facing surface of each bezel segment comprises a single, longitudinally extending strip or band of retro-reflective material. To take best advantage of the properties of the retro-reflective material, the bezel segments are oriented so that their inwardly facing surfaces lie in a plane generally normal to the plane of the interactive surface 24.

A tool tray 48 is affixed to the interactive board 22 adjacent the bottom bezel segment using suitable fasteners such as for example, screws, clips, adhesive etc. As can be seen, the tool tray 48 comprises a housing having an upper surface configured to define a plurality of receptacles or slots. The receptacles are sized to receive one or more pen tools 40 as well as an eraser tool (not shown) that can be used to interact with the interactive surface 24. Control buttons (not shown) are also provided on the upper surface of the tool tray housing to enable a user to control operation of the interactive input system 20. Further specifics of the tool tray 48 are described in International PCT Application Publication No. WO 2011/085486, filed on Jan. 13, 2011, and entitled "INTERACTIVE INPUT SYSTEM AND TOOL TRAY THEREFOR".

Imaging assemblies (not shown) are accommodated by the bezel 26, with each imaging assembly being positioned adjacent a different corner of the bezel. Each of the imaging assemblies comprises an image sensor and associated lens assembly that provides the image sensor with a field of view sufficiently large as to encompass the entire interactive surface 24. A digital signal processor (DSP) or other suitable processing device sends clock signals to the image sensor causing the image sensor to capture image frames at the desired frame rate. During image frame capture, the DSP also causes an infrared (IR) light source to illuminate and flood the region of interest over the interactive surface 24 with IR illumination. Thus, when no pointer exists within the field of view of the image sensor, the image sensor sees the illumination reflected by the retro-reflective bands on the bezel segments and captures image frames comprising a continuous bright band. When a pointer exists within the field of view of the image sensor, the pointer occludes IR illumination and appears as a dark region interrupting the bright band in captured image frames.

The imaging assemblies are oriented so that their fields of view overlap and look generally across the entire interactive surface 24. In this manner, any pointer such as for example a user's finger, a cylinder or other suitable object, or a pen or eraser tool lifted from a receptacle of the tool tray 48, that is brought into proximity of the interactive surface 24 appears in the fields of view of the imaging assemblies and thus, is captured in image frames acquired by multiple imaging assemblies. When the imaging assemblies acquire image frames in which a pointer exists, the imaging assemblies convey pointer data to the computing device 28.

The general purpose computing device 28 in this embodiment is a personal computer or other suitable processing device comprising, for example, a processing unit, system memory (volatile and/or non-volatile memory), other non-removable or removable memory (e.g. a hard disk drive, RAM, ROM, EEPROM, CD-ROM, DVD, flash memory, etc.) and a system bus coupling the various computer components to the processing unit. The computing device 28 may also comprise networking capabilities using Ethernet, WiFi, and/or other suitable network format, to enable connection to shared or remote drives, one or more networked computers, or other networked devices. The computing device 28 processes pointer data received from the imaging assemblies and computes the location of any pointer proximate the interactive surface 24 using well known triangulation. The computed pointer location is then recorded as writing or drawing or used an input command to control execution of an application program as described above.

Figure 1B:
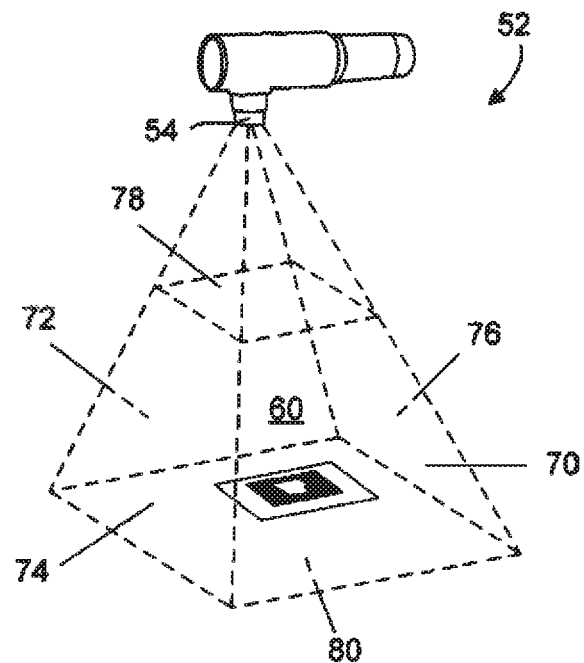
FIG. 1B is a perspective view of a 3D input device forming part of the interactive input system of FIG. 1A showing the 3D input space imaged thereby.

The interactive input system 20 also comprises a three-dimensional (3D) input device 52 that communicates with the computing device 28 via a USB cable 50. Those of skill in the art will understand that alternative wired connections, such as for example VGA, DVI, HDMI and the like or suitable wireless connections to connect the 3D input device 52 to the computing device 28 may be employed. The 3D input device 52 comprises a camera 54 mounted to a base 58 via an articulated arm 56. The camera 54 has a field of view that looks into a 3D input space 60. The 3D input space 60 defines a volume within which a physical object or marker from a set of markers may be manipulated. FIG. 1B better illustrates the 3D input space 60 together with a marker 62 from the set. For ease of illustration, only the camera 54 of the 3D input device 52 is shown. The 3D input space 60 in this embodiment takes the form of a pyramidal frustum. Thus, the 3D input space comprises six (6) boundary surfaces, i.e., front, back, left, right, top and bottom surfaces 70 to 80. These boundary surfaces, except for the bottom surface 80, may be used to define clipping planes, and used to detect a clipping planes gesture as described in International PCT Application Publication No. WO 2012/009789, filed on Jul. 19, 2011 and assigned to SMART Technologies ULC, the content of which is incorporated herein by reference in its entirety. The images captured by the camera 54 are processed by control circuitry (not shown) in the base 58 to adjust the brightness, clarity and/or resolution of the images and to convert the images into digital form, prior to being sent to the computing device 28.

In this embodiment, each marker of the set is in the form of a planar card having a pattern printed or otherwise applied to at least one surface thereof, or a cube with at least one surface having a pattern printed or otherwise applied thereto. The pattern comprises a rectangular dark or black box having an arrangement of light or white blocks thereon. The arrangement of white blocks on the black box is unique to each marker. This allows each marker to be associated with different digital content 64 and/or with a different digital content manipulation. As shown in FIG. 1A, the marker 62 is associated with digital content 64 in the form of an image of a stadium or arena that is presented on the interactive surface 24.

When a marker is brought into the 3D input space 60 and is captured in an image acquired by the camera 54, after the image has been preprocessed and converted into digital form by the control circuitry in the base 58, the computing device 28 processes the image to recognize the pattern. Once recognized, the computing device 28 determines the digital content 64 associated with the recognized pattern. Thereafter, the computing device 28, using a position mapping rule, combines the captured image, the digital content 64 associated with the recognized pattern on the marker and the graphical interface of the executing application program and outputs the resultant image data to the projector 38 for presentation on the interactive surface 24. In this case, the digital content 64 is superimposed on the captured image and graphical interface. Thus, an image comprising both the real-world and digital content is displayed on the interactive surface 24. Users of the interactive input system 20 may manipulate the marker 62, e.g., by moving, rotating or tilting the marker 62 within the 3D input space 60, to interact with and manipulate the digital content displayed on the interactive surface 24. For example, a user may rotate the marker 62 to rotate the digital content 64 and view it from different vantage points as desired.

In some embodiments, some patterns on the marker 62 are recognized by the computing device 28 as digital tools, which may be used to facilitate the manipulation of digital content. Here, the digital content refers to 2D or 3D digital objects generated by the computing device 28 (in contrary to physical or real-world objects), and are represented by one or more graphic objects displayed on the interactive surface 24. A digital tool is a digital object generated by the computing device 28 that may be used to manipulate other digital objects. However, a digital tool may also be considered as digital content when it is manipulated by other digital tools.

In order to recognize patterns on markers 62, the computing device 28 maintains a pattern library comprising pattern reference images captured during interactive input system calibration, with each pattern reference image being captured with the pattern positioned at a known z coordinate (reference point) and orientation within the 3D input space 60. In this embodiment, during pattern reference image capture, the patterns are positioned to lie in planes corresponding to the bottom plane 80 of the 3D input space 60. In order to determine the z coordinate of a marker placed in the 3D input space 60, the computing device 28 compares the size of the pattern in the pattern reference image to the size of the pattern in the image captured by the camera 54. The ratio of the sizes allows the position of the marker along the z-axis of the 3D input space 60 to be determined. For example, if the ratio is equal to one (1), signifying that the size of the pattern in the pattern reference image and the size of the pattern in the image captured by the camera 54 are the same, the z coordinate of the marker is determined to coincide with the bottom plane 80. The computing device 28 also calculates the marker's angle of rotation by comparing the direction of the pattern of the marker in the captured image to the pattern reference image, and calculates the angle of tilting based on the perspective distortion of the pattern in the captured image. In this embodiment, the top plane 78 is defined as an x-y plane at a location along the z-axis at which the image of the pattern captured by the camera 54 substantially occupies the entire field of view of the camera 54.

Those skilled in the art will appreciate that other definitions of the 3D input space 60 and the reference point are also available. For example, in an alternative embodiment, the top plane 78 is defined at a position along z-axis at which the size of the marker that is parallel to the top and bottom planes in the captured image equals a pre-defined size. In another alternative embodiment, the reference point is defined at a known position along the z-axis at which the size of a marker seen by the camera 54 equals a predefined size. In this embodiment, the bottom plane 80 may be higher or lower than the reference point, depending on the interactive input system configuration.

Figure 1C:
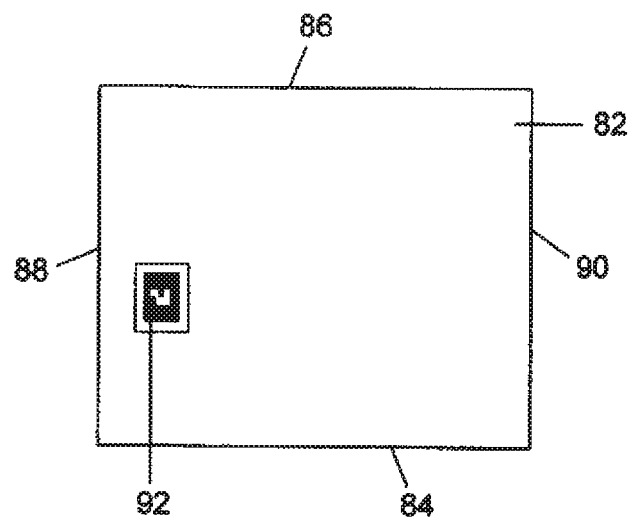
FIG. 1C is an image of the 3D input space captured by the 3D input device of FIG. 1B.

FIG. 1C shows an exemplary image 82 of the 3D input space 60 captured by the camera 54. The borders 84 to 90 of the image 82 correspond to the planes 70 to 76, respectively. During processing of the image 82, the computing device 28 detects the coordinates of the marker 92 in the image 82, and converts the coordinates to x-y coordinates of the 3D input space 60. For example, if the marker 92 is near the border 88 in the image 82, it is then determined that the marker 92 is proximate to the plane 74. As described above, the marker's coordinate along the z-axis is calculated by comparing the size of the pattern 92 in the image 82 with the size of the corresponding pattern reference image in the library.

In this embodiment, the computing device 28 runs a host software application such as SMART Notebook™ offered by SMART Technologies ULC. As is known, during execution, the SMART Notebook™ application provides a graphical user interface comprising a canvas page or palette, that is output to the projector 38 and presented on the interactive surface 24, and on which freeform or handwritten ink objects together with other computer generated objects can be input and manipulated via pointer interaction with the interactive surface 24.

Figure 2A:
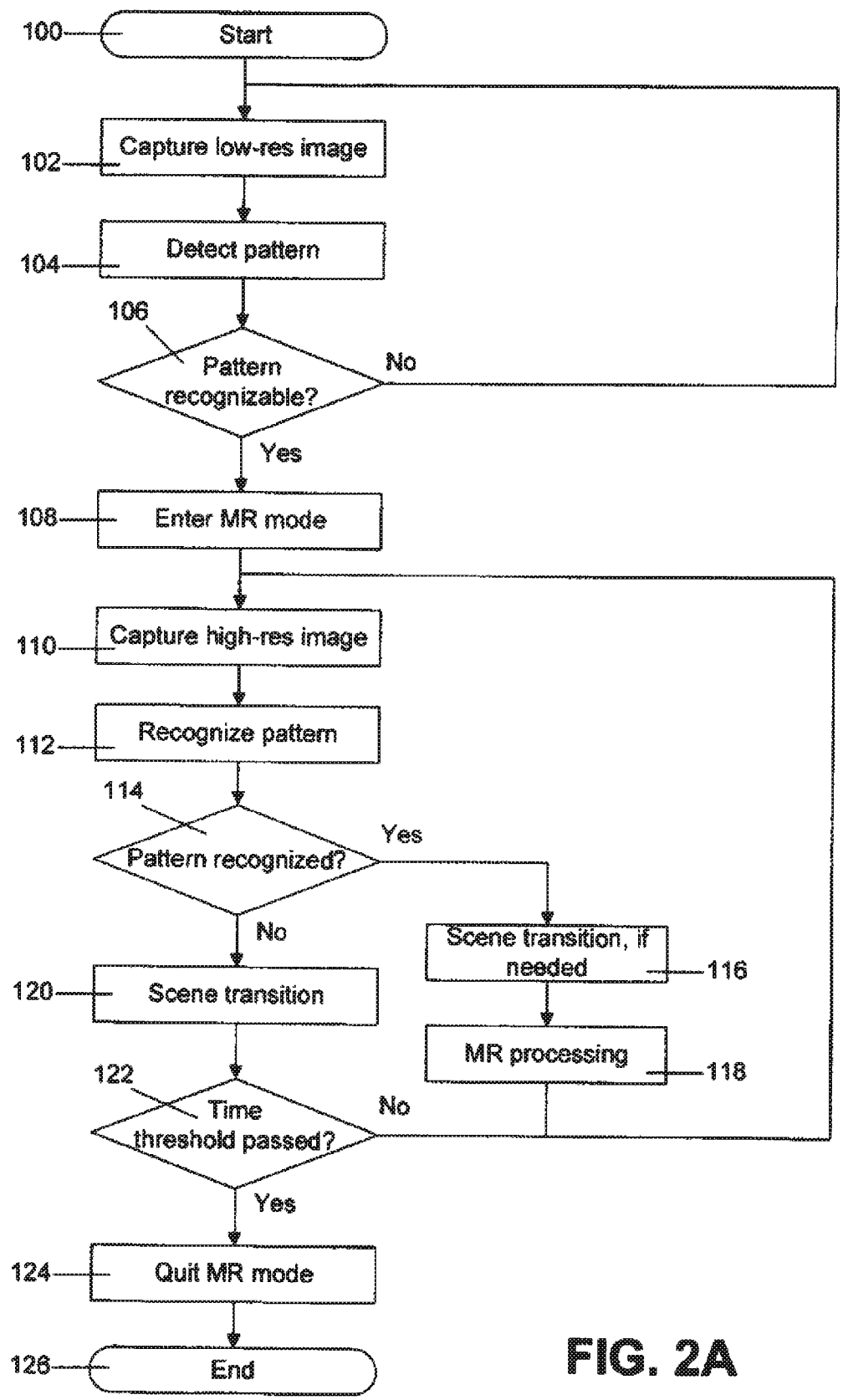
FIG. 2A is a flowchart showing steps performed during manipulation of digital content by tracking physical objects in the 3D input space.

The SMART Notebook™ application provides a mixed reality (MR) mode in a page of a SMART Notebook™ file to display 3D digital tools and content, and allow users to manipulate them by using one or more markers brought into the 3D input space 60. The computing device 28 automatically turns on the MR mode when a marker is detected in the 3D input space 60, and turns off the MR mode when no marker is detected in the 3D input space. When the MR mode is turned on, the computing device 28 continuously tracks markers 62 in the 3D input space 60 to control the manipulation of digital content 64. FIG. 2A illustrates the process of manipulating digital content by tracking markers in the 3D input space 60.

After the interactive input system 20 starts and the camera 54 is switched on (step 100), the camera is set to a low-resolution mode with a slow frame rate so that the camera 54 captures a low-resolution image of the 3D input space 60 at regular intervals such as for example every three (3) seconds. When an image is captured, it is preprocessed and converted to a digital image by the control circuitry in the base 58 (step 102). The digital image is then conveyed to the computing device 28 and the image is processed to detect whether a recognizable pattern is present in the image (step 104).

If no recognizable pattern is present (the "No" branch of step 106), the process reverts to step 102 and the next low resolution image is captured by the camera 54. If it is determined that at least one pattern can be recognized (the "Yes" branch of step 106), the computing device 28 turns on the MR mode (step 108). At this step, the computing device 28 first checks to determine whether the Notebook™ application program is running. If yes, the computing device 28 turns on the MR mode in the current Notebook™ page; otherwise, the computing device 28 launches the Notebook™ application program, and turns on the MR mode in a new Notebook™ page.

When the MR mode is turned on, an MR window is overlaid on the Notebook™ page presented on the interactive surface 24, displaying the image captured by the camera 54. The graphic objects on the Notebook™ page are then brought into the MR window to allow users to manipulate the graphic objects using markers positioned within the 3D input space 60. Then, the camera 54 is conditioned to a high-resolution mode and triggered so that the camera 54, captures a high-resolution image of the 3D input space 60 (step 110). The captured high-resolution image is preprocessed and converted to a digital image by the control circuitry in the base 58. The digital image is then conveyed to the computing device 28 and the image is processed to detect whether a recognizable pattern is present in the image, and, if so, to recognize the pattern (step 112).

If no pattern is recognized (the "No" branch of step 114), the computing device 28 applies a transition effect (e.g., a fade-out effect) to the scene in the MR window (step 120). The computing device 28 also starts a timer if not already started. At step 122, the computing device 28 checks the timer to determine if a threshold period of time has elapsed. If not, the process reverts to step 110 and another high-resolution image of the 3D input space 60 is captured. If the threshold time period has elapsed, the computing device 28 then moves the digital content in the MR window to the current Notebook™ page and terminates the MR mode (step 124). The process then ends (step 126).

If, at step 112, at least one pattern is recognized (the "Yes" branch of step 114), the computing device 28 checks the timer to determine if it has been initiated. If so, the computing device 28 stops the timer and applies another transition effect (e.g., a fade-in effect) to the scene in the MR window (step 116).

Then, the computing device 28 processes the MR scene in the MR window, and modifies the high-resolution image captured by the camera 54 before displaying it on the interactive surface 24 (step 118). At this step, the computing device 28 compares the recognized pattern obtained from the captured image with the corresponding pattern reference image in the library to calculate the z coordinate of the marker in the 3D input space 60 and the rotation and tilting angles of the recognized pattern as described above. The x-y coordinates of the recognized pattern are directly calculated from the captured image. Historical data of the recognized pattern is also used to determine other parameters of the marker, such as for example, its velocity and acceleration of moving, rotating and tilting. The calculated parameters are then used to determine the interaction of the digital content in the image, which will be described herein. The image is then modified and displayed on the interactive surface 24. The process then reverts to step 110 and another high-resolution image of the 3D input space 60 is captured by the camera 54.

Figure 2B:
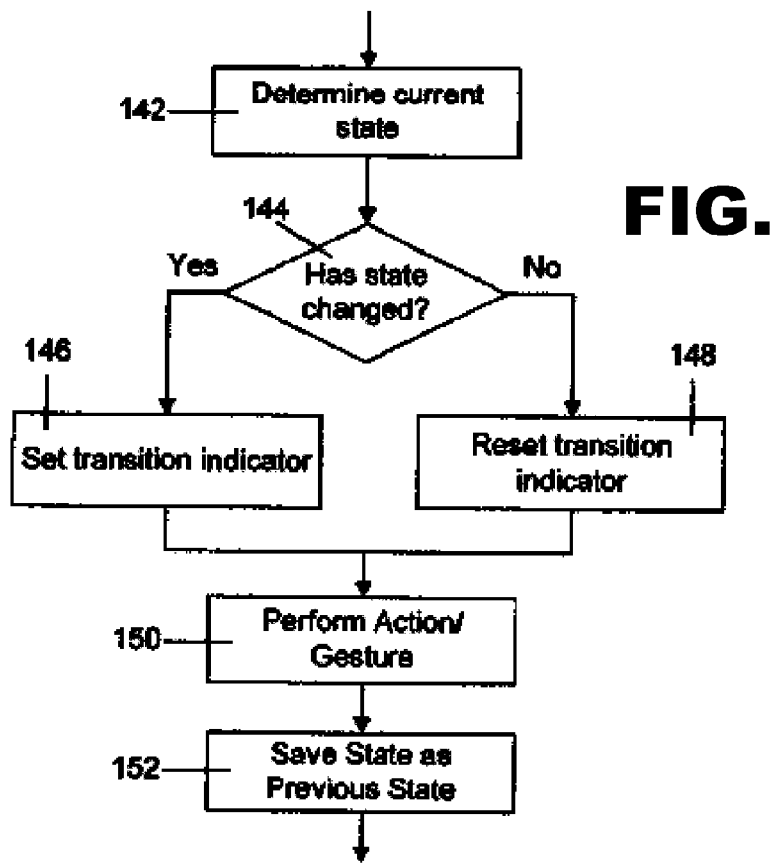
FIG. 2B is a flowchart showing steps performed during mixed reality processing.

FIG. 2B shows the steps performed during MR processing at step 118. At step 142, the computing device 28 determines the state of the marker and whether the state has changed from a previous state (step 144). If the state of the marker has changed from a previous state, the computing device 28 sets a transition indicator associated with the marker to a value based on the type of state transition (step 146), and the process proceeds to step 150. If at step 144 it is determined that the state of the marker has not changed, the transition indicator is reset to "No transition", and the process proceeds to step 150.

At step 150, the computing device 28 determines the action or gesture of the marker based on the marker's type, state transition, value of the transition indicator and the parameters calculated above, and modifies the image presented on the interactive surface 24 so that the digital content is manipulated accordingly. For example, the movement of a content marker within the 3D input space 60 (i.e., a marker comprising a pattern representing digital content) causes the corresponding digital content to move accordingly. The rotation of a tool marker within the 3D input space 60 (i.e., a marker comprising a pattern representing a digital tool) may cause panning of the image presented on the interactive surface 24.

At step 152, the current state and the calculated parameters are saved as the marker's previous information and the process reverts to step 110.

Figure 3:
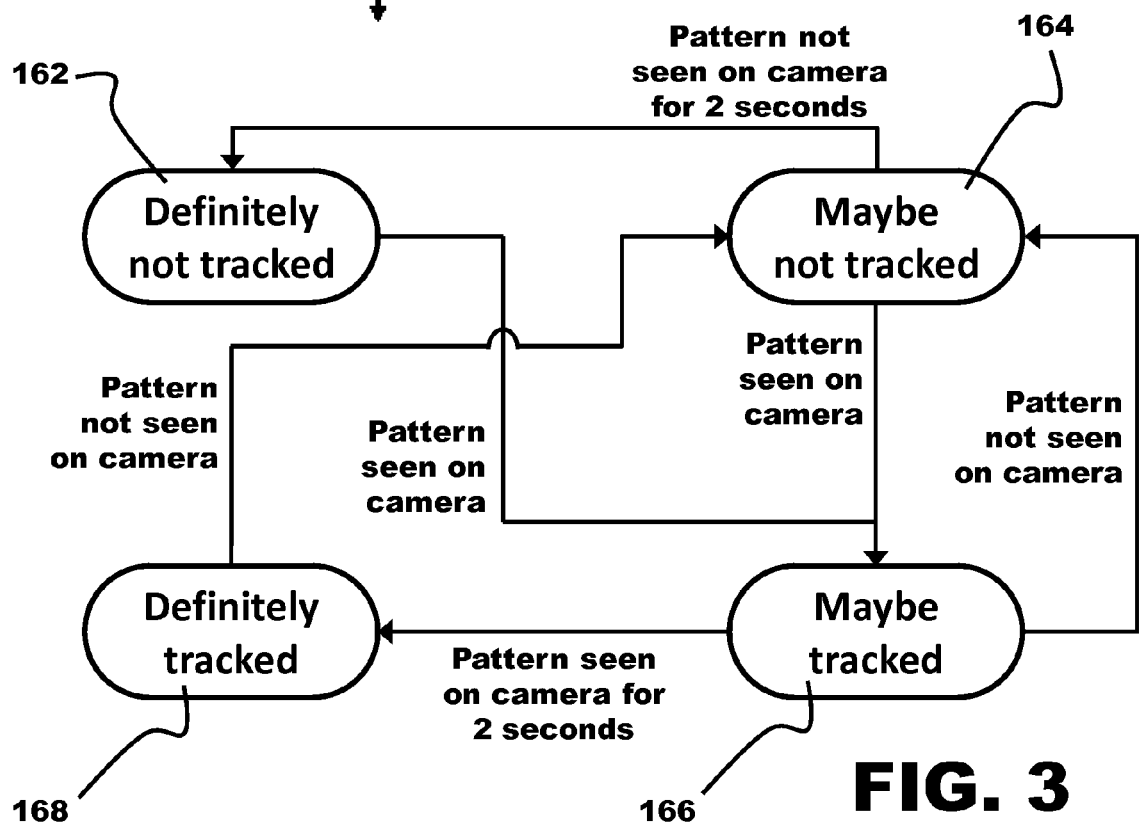
FIG. 3 shows the possible states of a physical object in the 3D input space and transitions of the possible states.

FIG. 3 shows the states and their transitions. In some embodiments, each marker transitions between four states, i.e., "Definitely not tracked" 162, "Maybe not tracked" 164, "Maybe tracked" 166 and "Definitely tracked" 168. The state transition starts from the state "Definitely not tracked" 162, signifying that the computing device 28 cannot recognize the marker. In this case, digital content associated with the marker that was previously presented on the interactive surface 24 is to be deleted. If the computing device 28 cannot recognize the marker, the marker stays in this state, and the transition indicator is reset to "No transition". However, if the computing device 28 recognizes the pattern of the marker, the marker then transitions to the state "Maybe tracked" 166, signifying that the computing device 28 has recognized the marker and starts to track it. In this case, in some embodiments, the transition indicator is set to "Fade-in". Thus, when the computing device 28 performs actions or gestures (step 150 in FIG. 2B), the digital content associated with the marker will gradually appear in the image presented on the interactive surface 24 with a fade-in effect.

In the state "Maybe tracked" 166, if the pattern has been recognized for more than two (2) seconds, or another suitable threshold period of time, the marker then transitions to the state "Definitely tracked" 168, signifying that the computing device 28 is affirmatively tracking the marker. The transition indicator is set to "Fade-in". If the computing device 28 loses tracking of the marker when the marker is in the state "Maybe tracked" 166, the marker then transitions to the state "Maybe not tracked" 164, signifying that the computing device 28 is losing track of the marker. The transition indicator is set to "Fade-out". Thus, when the computing device 28 performs actions or gestures (step 150 in FIG. 2B), the digital content associated with the marker will gradually disappear in the image presented on the interactive surface 24 with a fade-out effect.

In the state "Definitely tracked" 168, the marker stays in this state if the pattern is recognized, and the transition indicator is reset to "No transition". However, if the pattern cannot be recognized, the marker then transitions to the state "Maybe not tracked" 164. The transition indicator is set to "Fade-out".

In the state "Maybe not tracked" 164, if the marker has not been recognized for more than two (2) seconds, or another suitable threshold period of time, the marker then transitions to the state "Definitely not tracked" 162, and the transition indicator is set to "Fade-out". However, if the marker is recognized when it is in the state "Maybe not tracked" 164, the marker then transitions to the state "Maybe tracked" 166, and the transition indicator is set to "Fade-in".

In this configuration, the digital content associated with the marker gradually appears when the marker is recognized by the computing device 28 and the digital content needs to be inserted into the image projected onto the interactive surface 24. The digital content gradually disappears when the pattern cannot be recognized by the computing device 28 and the digital content needs to be deleted from the image projected onto the interactive surface 24. Thus, users do not experience abrupt disappearing and appearing of digital content when the marker is brought out of or into the 3D input space 60 nor do users experience unwanted image flickering during temporary loss of marker tracking.

The transition and smoothing effects as well as some manipulation methods using gestures, such as for example, shaking, covering, stacking, swiping, etc., are described further in above-incorporated International PCT Application Publication No. WO 2012/009789 to Antonyuk et al.

Figure 4A:
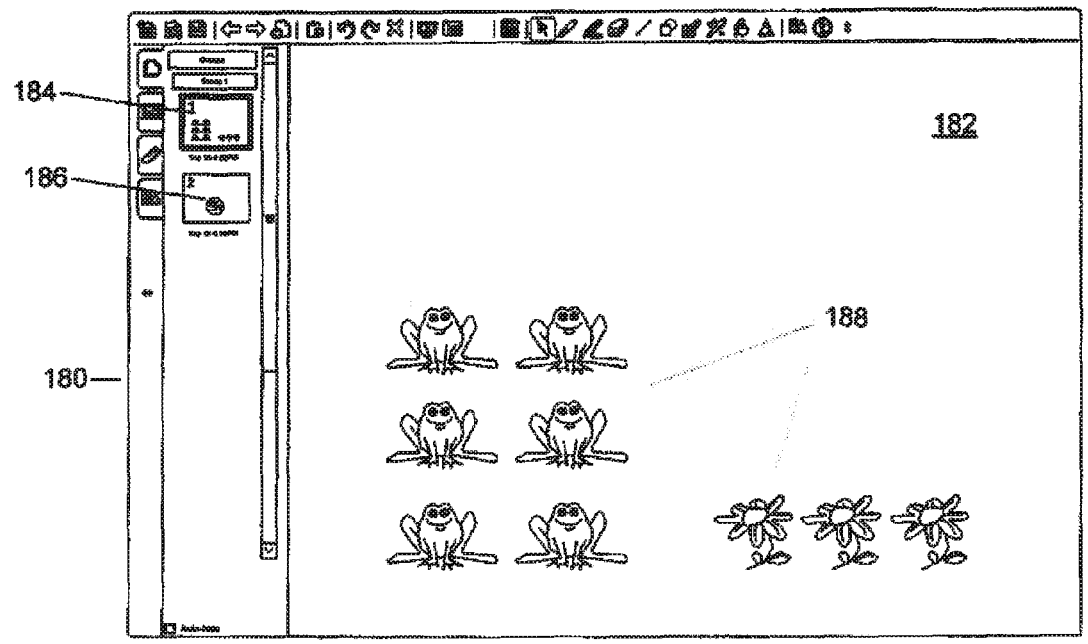
FIGS. 4A and 4B illustrate an example of an application program window transitioning from a non-mixed reality mode to a mixed-reality mode.
Figure 4B:
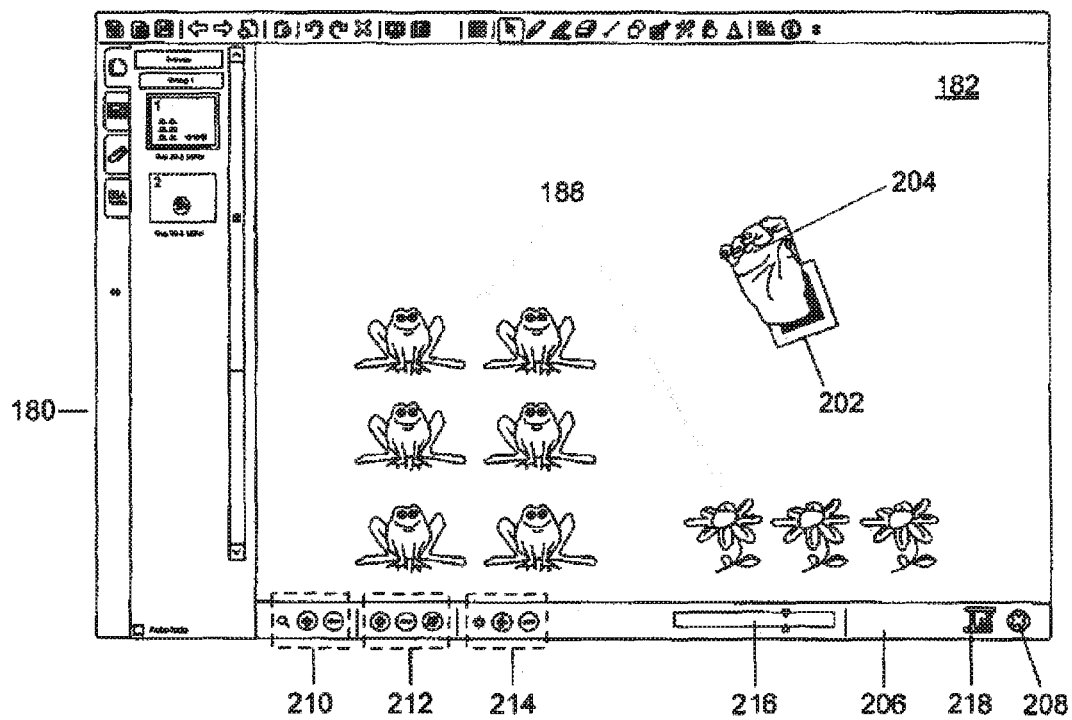

FIGS. 4A and 4B illustrate an example of a SMART Notebook™ page transitioning from a non-mixed reality mode to a mixed reality (MR) mode. FIG. 4A shows a SMART Notebook™ program window 180 that comprises two pages indicated by two page thumbnails 184 and 186, respectively. Page thumbnail 184 is associated with page 182 currently displayed in the SMART Notebook™ program window 180. Here and in the following examples, the page thumbnail associated with the current page that is displayed in the program window 180 comprises a thick border. Various pieces of digital content 188 (in this example, frogs and flowers) are displayed in the SMART Notebook™ page 182.

In FIG. 4A, the MR mode is turned off. The camera 54, as described above, captures low-resolution images of the 3D input space 60 at regular intervals, which are processed by the computing device 28. As shown in FIG. 4B, when a marker 202 is brought into the 3D input space 60, and the pattern carried by the marker is recognized by the computing device 28 during processing of an image captured by camera 54, the MR mode is then turned on. A transparent MR window (not shown) is then overlaid on the SMART Notebook™ page 182 and the digital content 188 is brought into the MR window. In this example, the marker 202 is assumed not to be associated with digital content. Thus, the computing device 28 associates a 3D cursor 204 to the marker, and the 3D cursor 204 appears in the Notebook™ program window 180 with a transition effect, e.g., fade-in, proximate to the image of the marker 202. Those skilled in the art will appreciate that if a marker having associated digital content is brought into the 3D input space 60, and is recognized by the computing device 28 during processing of an image, the associated digital content will be shown in the SMART Notebook™ program window 180.

In addition to the appearance of the 3D cursor 204, a toolbar 206 also appears in the MR window. The toolbar 206 comprises various function tools for controlling the MR environment. For example, a close button 208 may be used to turn off the MR mode. Zoom buttons 210 may be used to control the zooming of the camera 54. Focus buttons 212 may be used to manually or automatically adjust the focusing of the camera 54. Brightness buttons 214 may be used to adjust the brightness or darkness of images captured by the camera 54. An adjustable contrast bar 216 may be used to control the luminance of the camera 54. In some embodiments, the user may also interact with control buttons on the base 58 to execute the same functions in the toolbar 206. The camera icon 218 provides a visual indication signifying that the SMART Notebook™ page 182 is currently in the MR mode.

FIGS. 5A to 5C illustrate a rotation gesture for selecting digital content. In this embodiment, as shown in FIG. 5A, a cube-shaped marker 222 is placed within the 3D input space 60 so that the marker 222 appears on the interactive surface 24 within a defined proximity of the 3D content 220 that the user wishes the marker to be associated with. It is assumed that cube-shaped marker 222 currently has no 3D digital content association. After the cube-shaped marker 222 has been rotated so that a different marker pattern is presented on the top face of the cube-shaped marker, following recognition of that pattern, the computing device 28 associates the marker pattern on the top face of the cube-shaped marker 222 with the 3D digital content 220. A line segment 224 is introduced, connecting the top face of the cube-shaped marker and the 3D content 220, indicating that the association has been made, as shown in FIG. 5B. The user is now free to manipulate the views of the 3D content 220 through manipulation of the cube-shaped marker 222 within the 3D input space 60. In FIG. 5C, the user has rotated the cube-shaped marker 222 back to its original orientation, which results in the computing device 28 disassociating the 3D content 220 from the cube-shaped marker 222.

FIGS. 6A to 6D illustrate an attraction technique for 3D content selection. As shown in FIG. 6A, as the cube-shaped marker 222, which is assumed to have no 3D content association, is moved within the 3D input space 60 so that its image displayed on the interactive surface 24 approaches the defined proximity of the 3D content 220 that the user wishes the marker to be associated with, the computing device 28 following processing of images captured by the camera 54, animates the 3D content 220 so that the 3D digital content appears to move towards the cube-shaped marker 222. This would appear to the user as if the 3D content 220 is attracted to the cube-shaped marker 222. In FIG. 6B, a segment 242 is shown connecting the cube-shaped marker 222 and the associated 3D content 220, to signify visually to the user that the association has been made. In FIG. 6C, the cube-shaped marker 222 is moved back and forth within the 3D input space 60 at a high rate in a shaking motion. This movement of the cube-shaped marker 222 within the 3D input space 60 is recognized by the computing device 28 as an input gesture, resulting in the computing device 28 disassociating the 3D content 220 from the cube-shaped marker 222. As a result, the segment no longer connects the 3D content 220 to the cube-shaped marker 222. In FIG. 6D, the 3D content 220, which has been disassociated from the cube-shaped marker 222, is not manipulated when the cube-shaped marker 222 is moved within the 3D input space 60.

FIGS. 7A to 7C illustrate a 3D content selection technique that makes use of a marker employing liquid crystal display (LCD) panels. In FIG. 7A, the user is holding a cube-shaped marker 262 within the 3D input space 60 so that its image displayed on the interactive surface 24 appears within a defined proximity of the 3D content that the user 260 wishes the marker to be associated with. The LCD panels 266 on the outer surfaces of the cube-shaped marker 262 present various marker patterns. The marker patterns are assumed to have no 3D content association. Upon pushing button 264, as shown in FIG. 7B, the marker pattern presented by each LCD panel 266 changes to a different marker pattern. With this change, following processing of an image captured by the camera 54, the computing device 28 associates the marker pattern on the top LCD panel 266 with the 3D content. As shown in FIG. 7C, the button 264 has been released and the user 260 is able to manipulate the associated 3D content by moving the cube-shaped marker 262 within the 3D input space 60.

FIGS. 8A and 8B show another method of content selection using a marker employing an LCD panel. FIG. 8A shows a marker comprising an LCD panel 282 presenting a marker pattern 288. The LCD panel 282 is attached to a handle 284. A trigger button 286 is provided on the handle. It is assumed that the marker pattern 288 currently has no 3D content association. When the trigger button 286 is pushed, the marker pattern 288 presented by the LCD panel 282 changes to a new marker pattern 290, as shown in FIG. 8B. When this marker pattern 290 appears in the LCD panel 282 and the image of the LCD panel displayed on the interactive surface 24 is within a defined proximity of 3D content, following processing of an image captured by the camera 54, the computing device 28 associates the marker pattern with the 3D content and the user is able to manipulate the views of the 3D content through manipulation of the LCD panel 282 within the 3D input space 60. When the trigger button 286 is pushed again, the marker pattern 290 presented by the LCD panel will change to another marker pattern resulting in the computing device 28 disassociating the 3D content from the LCD panel 282.

In yet another embodiment, the marker is in the form of an electronic device 295 having a display 294. The electronic device 295 in this embodiment comprises a processing unit, system memory (volatile and/or non-volatile memory), other non-removable or removable memory (e.g. a hard disk drive, RAM, ROM, EEPROM, CD-ROM, DVD, flash memory, etc.) and a system bus coupling the various components to the processing unit. The electronic device 295 may also comprise a network interface which facilitates networking using Ethernet, WiFi, and/or other network format, to enable connection to shared or remote drives, one or more networked computers, or other networked devices. The electronic device 295 may also comprise one or more of ports for coupling external data or hard drives thereto. An exemplary port can enable the electronic device 295 to receive SIM cards, flash drives, or external hard drives.

Figure 8C:
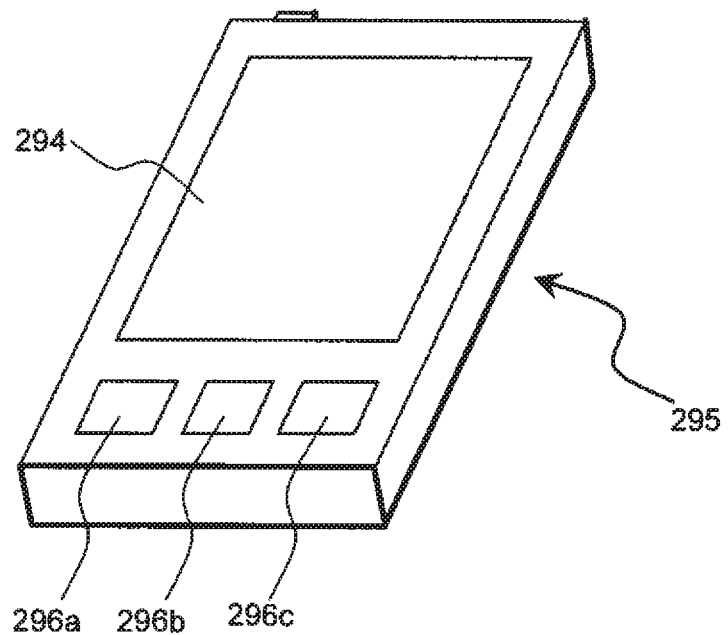
FIGS. 8C to 8M illustrate still yet another content selection technique that selects digital content in response to an electronic device having a display in the 3D input space.

As shown in FIG. 8C, the electronic device 295 has a generally cuboid-shaped housing having one or more user input/output mechanisms thereon, such as buttons 296a to 296c, switches, track wheels, click wheels, keyboards, microphones and speakers. In addition, the electronic device 295 may comprise one or more cameras to capture visual images or video. In this embodiment, the display 294 of the electronic device 295 is a 3 inch, grayscale LCD display 294 with a 480×480 pixel resolution, which provides sufficient resolution so that displayed information captured by camera 54 can be readily processed by the computing device 28 and recognized. The display 294 is also dimensioned to allow the electronic device to be suitably designed for portability and manipulation in the 3D input space.

Figure 8D:
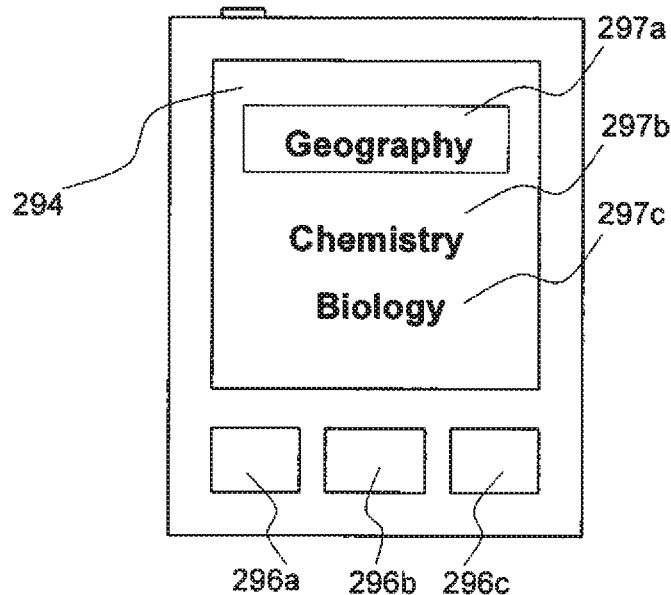
Figure 8E:
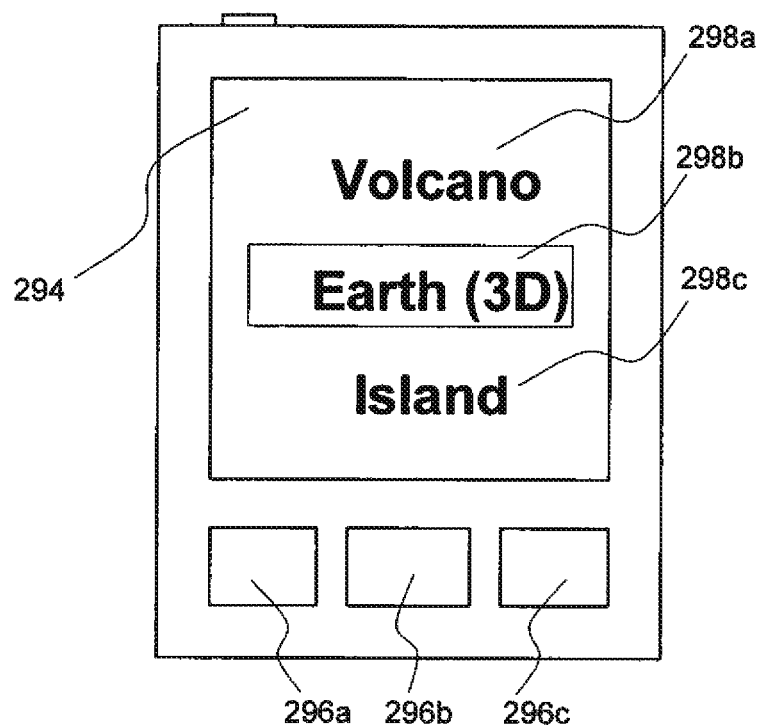

Images or video captured by the electronic device 295 may be stored in the memory within electronic device 295, transmitted over a communications network to another electronic device, edited, or processed as desired. FIG. 8D shows the electronic device 295 displaying an exemplary set of libraries each containing a plurality of electronic marker patterns. These libraries may be pre-selected on the computing device 28 and transferred to the electronic device 295 for storage via the network interface, or may be received from other sources, or composed on the electronic device 295. Buttons 296a and 296b are used to navigate between libraries, while button 296b is used to select a desired library, and allow a user to select from the set of marker patterns associated with the selected library. When selecting between marker patterns, the electronic device 295 may display one or more marker patterns, or one or more representations of marker patterns. Generally, a representation of a marker pattern may be a scaled down image of the marker pattern, a text description of the digital content associated with the marker pattern, or an image of the digital content associated with the marker pattern, as shown in FIG. 8E. In this case, buttons 296a and 296b are used to navigate between marker pattern representations, and button 296b is used to confirm a selection causing the marker pattern associated with the selected representation to be presented on display 294.

Figure 8F:
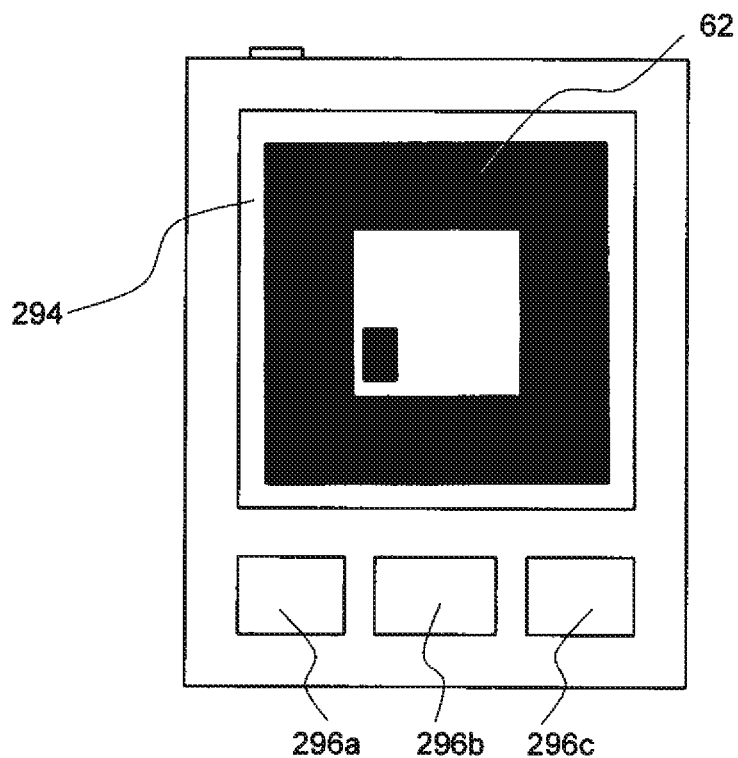
Figure 8G:
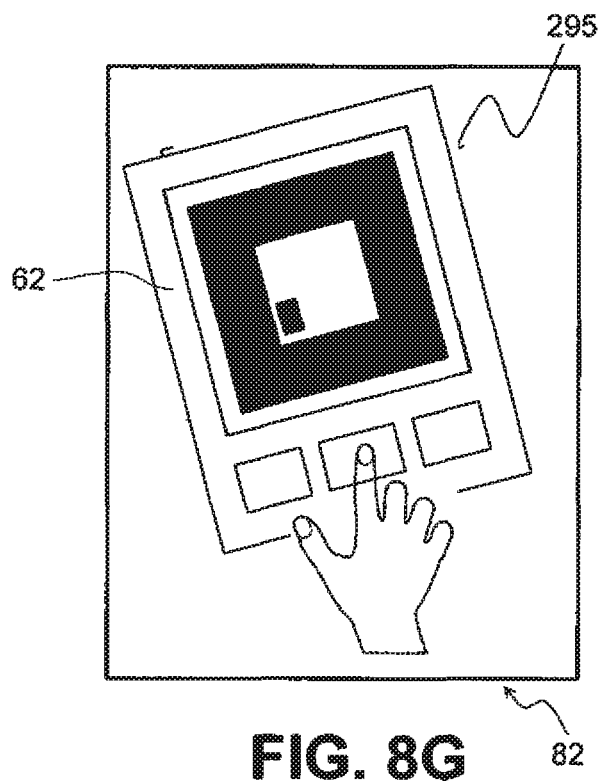
Figure 8H:
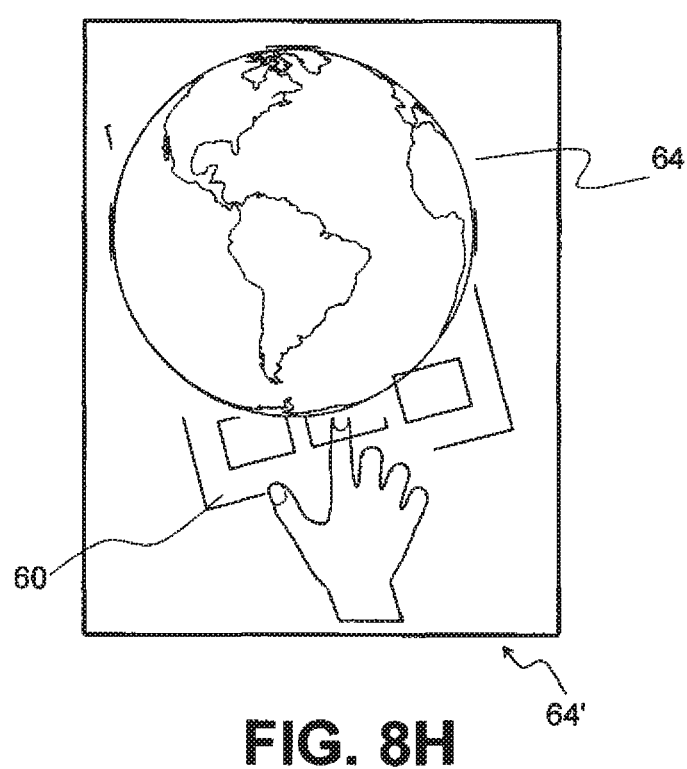
Figure 8I:
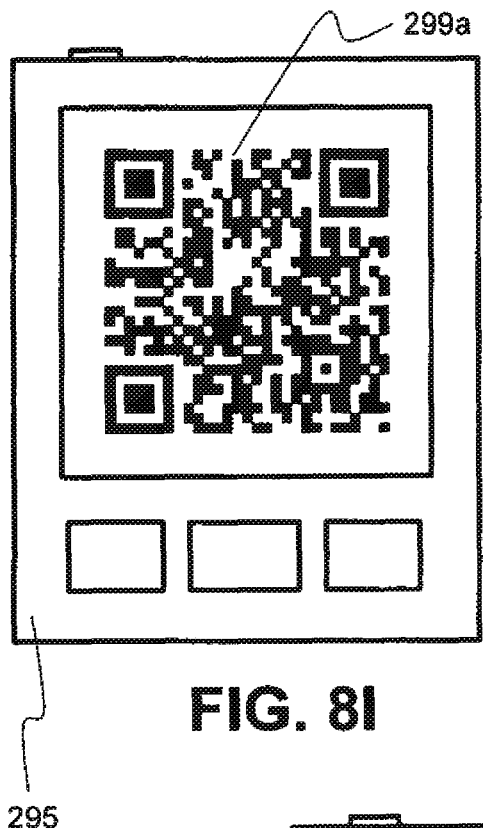

Turning to FIG. 8E once more, exemplary libraries 297a, 297b and 297c are shown and comprise marker patterns associated with digital content related geography, chemistry and biology, respectively. For example, a user may select library 297a containing geography related marker patterns and then choose a sub-category 298b related to 3D-earth content, which causes the display 294 to present a marker pattern associated with the 3D-earth content, as shown in FIG. 8F. An image frame 82 captured by camera 54 including the electronic device 295 displaying the marker pattern is shown in FIG. 8G. Although only one electronic device 295 is shown having one marker pattern within the field of view of the camera 54, there may be other marker patterns, either displayed on another electronic device 295, or on other media within the field of view of the camera 54.

After the image 82 has been preprocessed and converted into digital form by the control circuitry in the base 58, the computing device 28 processes the image 82 to recognize the marker pattern. Once recognized, the computing device 28 determines the digital content 64 associated with the recognized marker pattern. Alternatively, the electronic device 295 may transmit the identity of the displayed marker pattern to the computing device 28 which retrieves the associated digital content 64 from its libraries, thus bypassing the recognition step. Thereafter, the computing device 28, using a position mapping rule, combines the captured image 82, the digital content 64 associated with the recognized marker pattern and the graphical interface of the executing application program and outputs the resultant image data to the projector 38 for presentation on the interactive surface 24.

In this case, the digital content 64, such as a 3D earth object, is superimposed on the captured image and graphical interface. Thus, an image 64' comprising both the real-world and digital content 64 is displayed on the interactive surface 24. The electronic device 295 may be used to manipulate the displayed marker pattern e.g., by moving, rotating or tilting the electronic device 295 within the 3D input space 60, to interact with the digital content 64 displayed on the interactive surface 24. For example, a user may rotate the electronic device 295 to rotate the presented marker pattern and in turn rotate the digital content 64 and view it from different vantage points as desired.

Figure 8J:
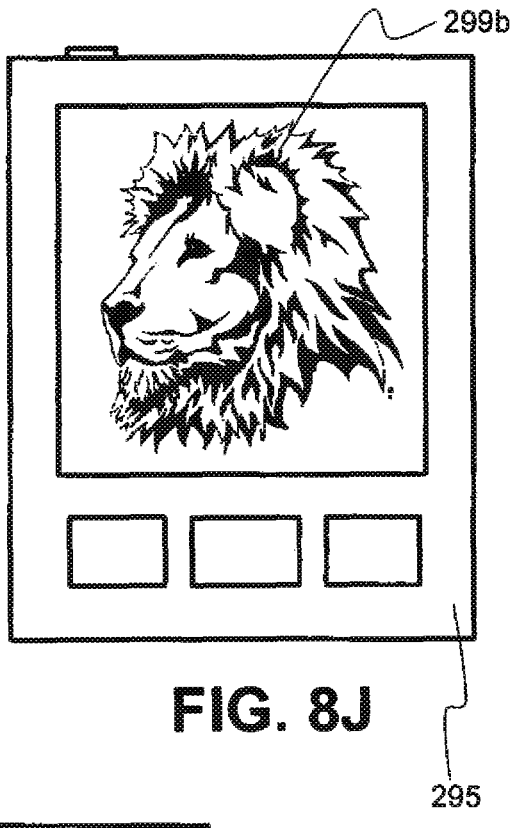
Figure 8K:
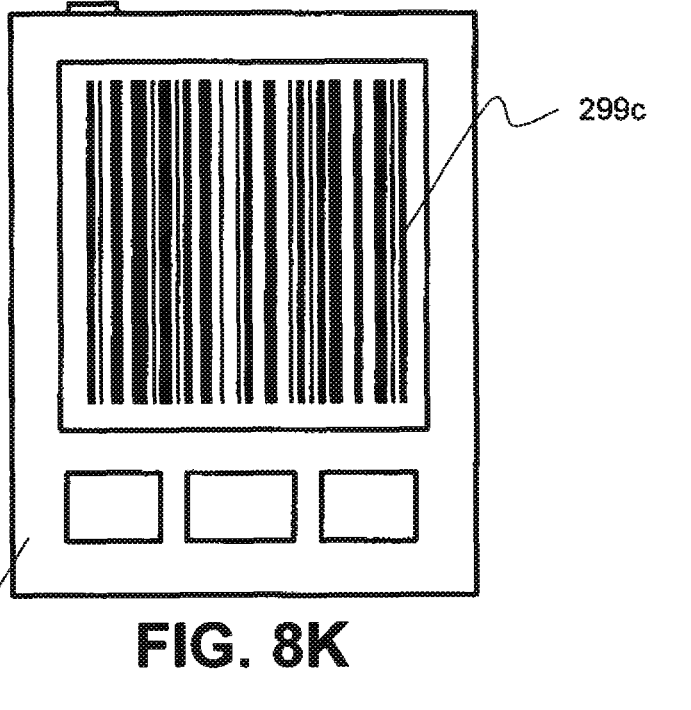
Figure 8L:
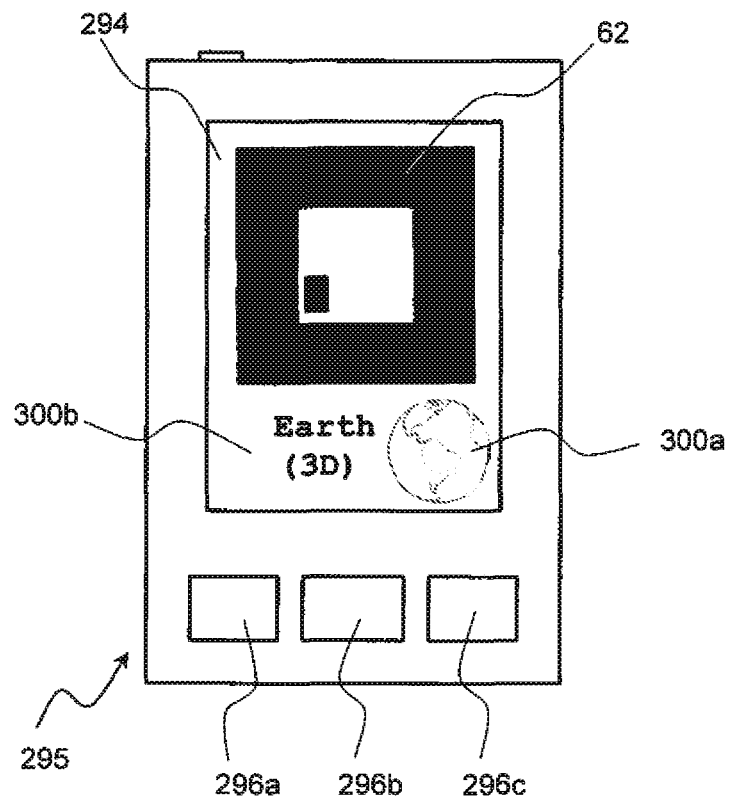

The marker pattern may be a CyberCode matrix type barcode, although other types of matrix barcodes can be used, such as, a QR Code type matrix barcode 299a, as shown in 8I. Other exemplary marker patterns may comprise a human readable marker, such as indicia resembling a black and white line drawing of a lion's head 299b, as shown in FIG. 8J, or linear barcode markers 299c, as shown in FIG. 8K. Alternatively, the marker pattern may comprise a visual depiction 300a of the digital content associated with the marker pattern, and a description 300b of the associated digital content, as shown in FIG. 8L. Such information allows the user to easily select desired marker patterns and anticipate what will be shown in the augmented reality image 64'. In another embodiment, images captured by camera of the electronic device 295 may be used as marker patterns.

Figure 8M:
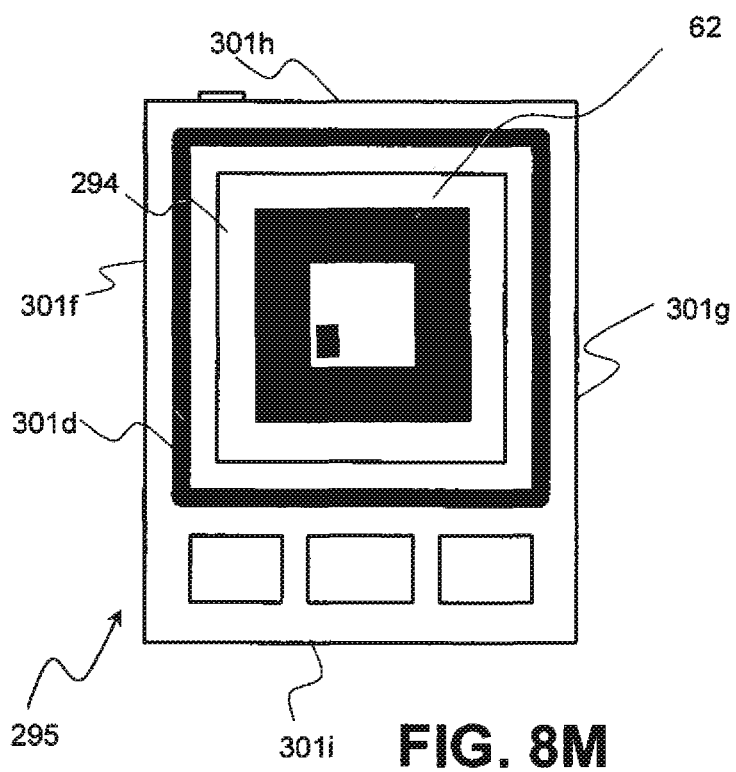

In another exemplary embodiment, the housing of electronic device 295 comprises a set of marker patterns 301d to 301i applied to each face of the housing, as shown in FIG. 8M. For example, marker pattern 301d is located on the front face of the electronic device 295 housing, marker pattern 301e is located on the opposing face of the housing (not shown), marker patterns 301f and 301g are located on two opposing side faces of the housing and marker patterns 301h and 301i are located on the other two opposing side faces of the housing. The marker patterns 301d to 301i allow the position and orientation of the electronic device 295 to be determined and tracked, while the marker pattern presented on the display 294 is analyzed to determine the associated digital content. Once the computing device 28 has determined the associated digital content, the computing device 28 then uses the location and orientation of marker patterns 301d to 301i to manipulate the digital content while a user selectively positions the electronic device 295 within the 3D input space. Accordingly, the digital content persists even when the marker pattern presented on the display can not be seen by the camera 54, especially, during rotating actions, tilting actions or occlusions. Alternatively, marker patterns 301d to 301i may be incorporated into the corners of the housing of electronic device 295 and take the form of contrasting black and white lines, linear or matrix bar codes, or illuminated areas from illuminations sources such as IR LEDs.

Figure 9A:
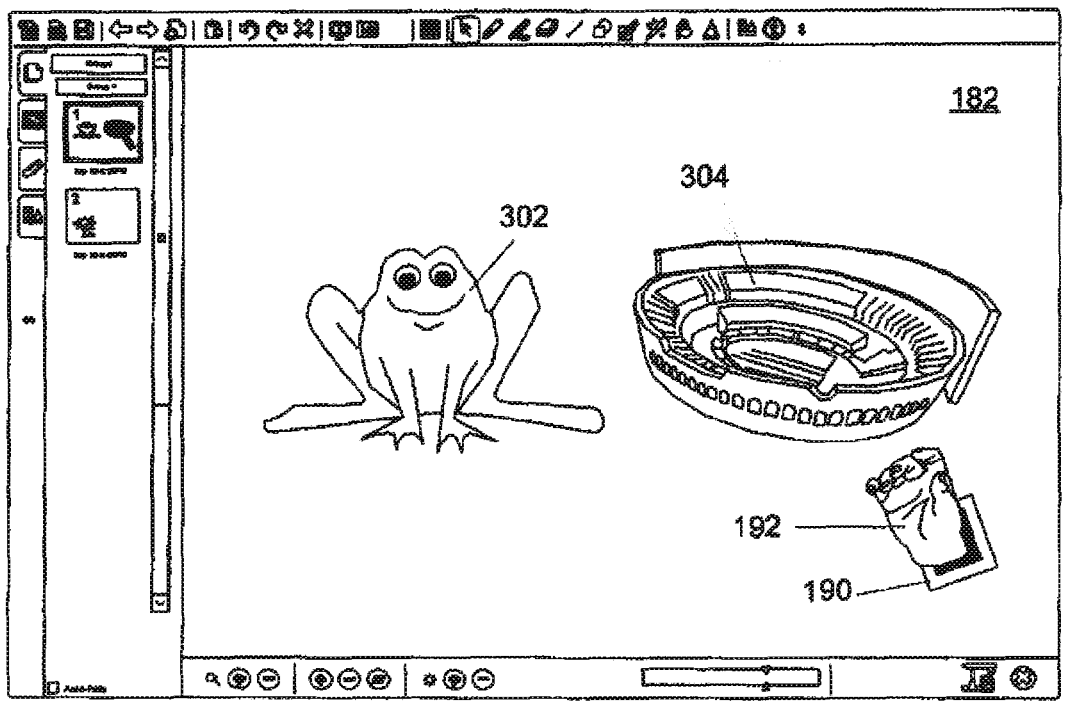
FIGS. 9A to 9C illustrate a dwelling gesture for selecting digital content in response to a physical object in the 3D input space.
Figure 9B:
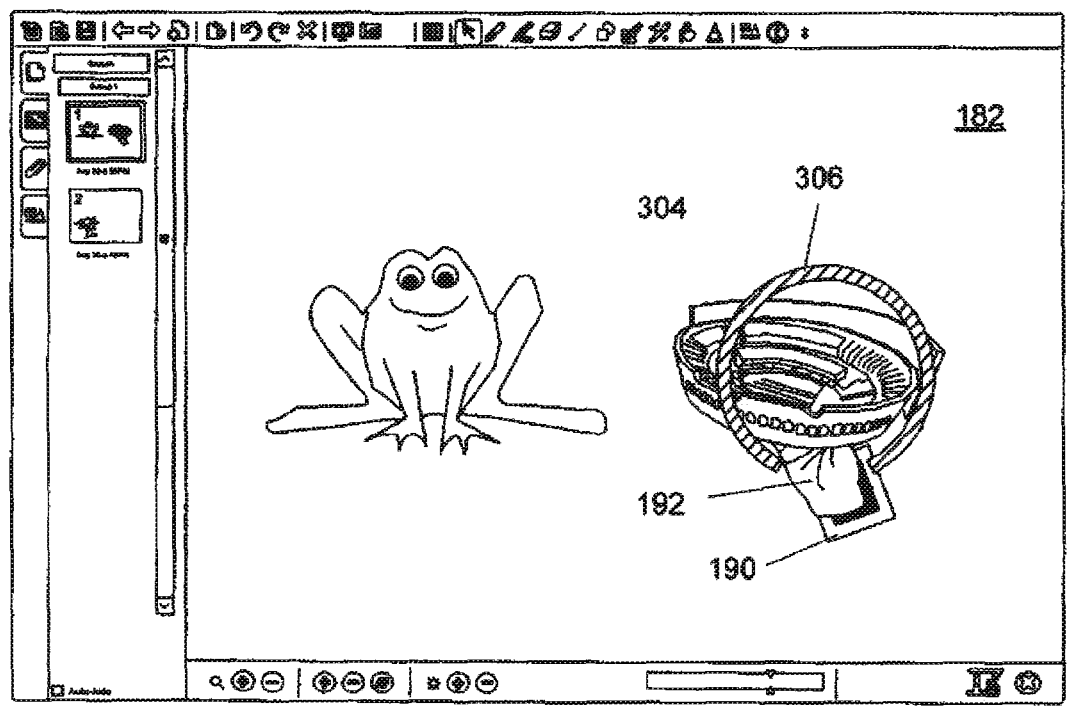
Figure 9C:
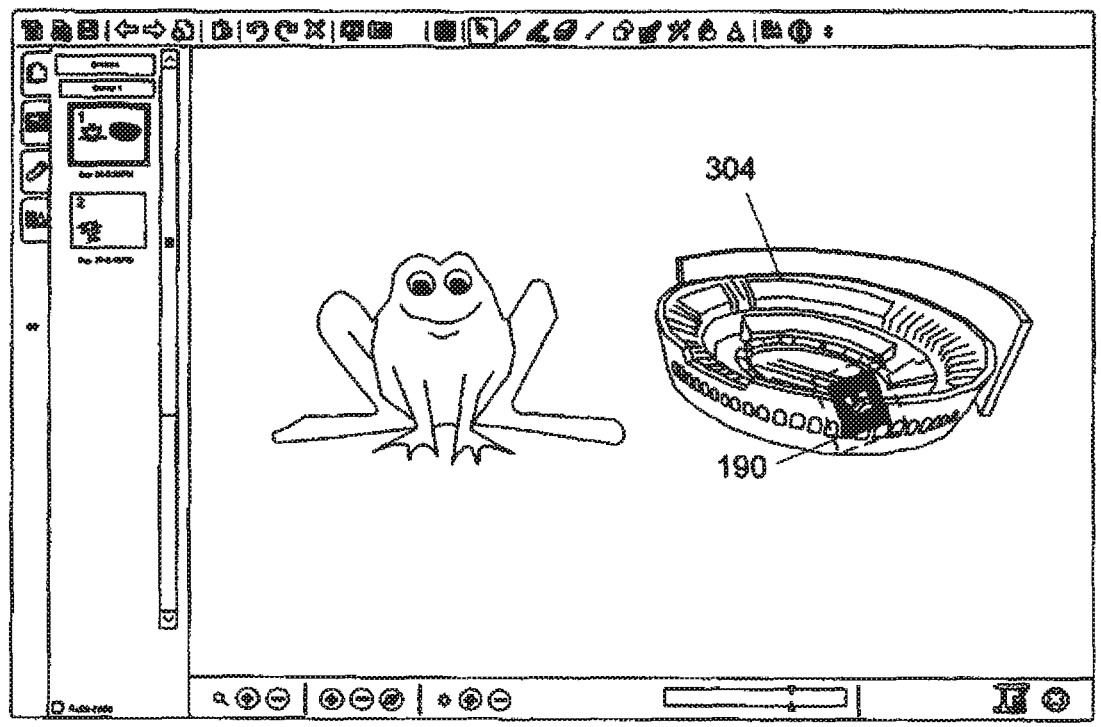

FIGS. 9A to 9C illustrate 3D content selection utilizing a dwelling technique. FIG. 9A shows a mixed reality canvas page 182 with selectable 3D content 302 and 304 presented thereon (in this example a frog and a stadium). A marker 190 that is assumed to have no associated 3D content is positioned within the 3D input space 60. As a result, following processing of images captured by the camera 54, the computing device 28 generates a 3D cursor 192 that appears proximate to the image of the marker within the canvas page 182. As shown in FIG. 9B, as the marker 190 is moved within the 3D input space to position the 3D cursor 192 within the defined proximity of the 3D content 304 that the user wishes the cursor to be associated with, the computing device 28 animates the 3D content 304 and visually scales the 3D content 304 down in size to provide a feeling of attraction to the 3D cursor 192. The 3D content 304 appears on top of the 3D cursor 192. The timer as described previously is started and a timing indication 306 is shown over the 3D content 304. The user is required to maintain the marker 190 within the defined proximity of the 3D content for a time period longer than the threshold time period (determined by the timer and indicated by the timing indication 306) in order to associate the 3D content 304 to the marker 190. If the 3D cursor 192 is moved beyond the defined proximity before the threshold time period has elapsed, the 3D content 304 will not become associated with the marker 190. However, as shown in FIG. 9C, if the threshold time period has elapsed while the marker 190 remains within the defined proximity of the 3D content 304, then the computing device 28 associates the 3D content 304 to the marker 190, and removes the 3D cursor 192 since the 3D content has now been associated to the marker 190. The 3D content 304 is then returned to its original size and the user may manipulate the views of the selected 3D content 304 as desired by moving the marker 190 within the 3D input space 60.

The above process is summarized by the following pseudo code:

```
L1: CubePosition3D = 3D position of the tracked marker that is not
associated with digital content;
L2: CubePosition2D = Calculating projection of CubePosition3D
onto the 2D Notebook ™ page;
L3: For each digital content on the Notebook ™ page,
        L4: ContentPosition2D = Calculating projection of 3D content
position onto the 2D Notebook ™ page;
        L5: Distance = distance between ContentPosition2D and
CubePosition2D;
        L6: If Distance < 50 mm
        L7: Scale content by Distance / 50;
        L8: If Distance < 20 mm
                L9: Start the dwell timer to select content if timer has not
already started (note: 2 seconds dwell is required)
                L10: If time elapsed < 2 seconds
                        L11: Render arc centered around ContentPosition2D
with angle (time elapsed) / (2 seconds) * 2Pi
                L12: Else
                        L13: Select content and apply animated transition to
position it on top of the marker
                L14: End If
        L15: Else
                L16: Stop and reset dwell timer; reset the content to its
original size;
        L17: End If
L18: End For
```

In the above pseudo code, the distance between the 3D cursor and the 3D content to determine if the 3D cursor is within the defined proximity of the 3D content is measured in millimeters. Those skilled in the art will appreciate that, in alternative embodiments, pixels or other suitable units may be used to measure the distance. Moreover, instead of using two seconds as the threshold time period, in some alternative embodiments, a different threshold time period may be used.

Although not shown, the user may cover the marker to disassociate the 3D content with the marker. The process of disassociating the 3D content with the marker after detection of the covering gesture may be summarized by the following pseudo code:

```
L1: If cover gesture detected
        L2: Start disassociation timer if it has not already started (note: 2
seconds deselect is required)
        L3: If time elapsed < 2
                L4: Render arc centered around ContentPosition2D with
angle (1 − (time elapsed) / (2 seconds)) * 2Pi
        L5: Else
                L6: Disassociate content with the marker and apply
animated transition to position it back on the Notebook ™ page
        L7: End If
L8: End If
```

Those skilled in the art will appreciate that instead of using two seconds as the threshold time period, in some alternative embodiments, a different threshold time period may be used.

Figure 10A:
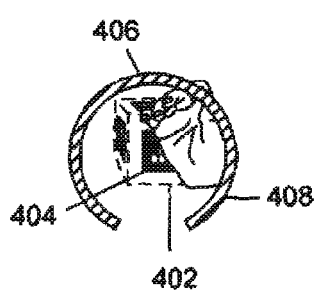
FIGS. 10A to 10C illustrate manipulation of a physical object in the 3D input space to open a menu and select an item thereof.
Figure 10B:
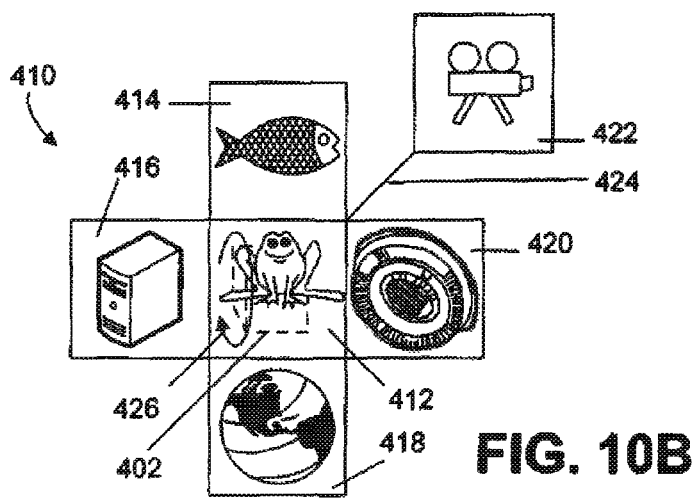

In some embodiments, a cube with each surface having a different pattern may be used to select from a set of predefined digital content. As shown in FIG. 10A, a selection tool in the form of a cube 402 with each surface of the cube having a different pattern thereon, is positioned within the 3D input space 60 and with the surface 404 facing the camera 54. The user is then assumed to apply a covering gesture (not shown) or another appropriate gesture to the cube 402 that is recognized by the computing device 28 through processing of images captured by the camera 54. In response, the computing device 28 displays an indicator 408 that starts to grow with a predefined speed to indicate the time that the covering gesture is maintained. When a predefined threshold time period has passed (indicated by the indicator growing to a full circle), the computing device 28 presents a menu 410 comprising six (6) digital contents 412 to 422 around the image of the cube 402 with an animation effect (e.g., fade-in) as shown in FIG. 10B. The menu 410 is arranged in such a way that the position of each digital content indicates the surface of the cube 402 to which it may be associated. For example, the digital content 412 overlaps with the image of the cube 402 indicating that it may be associated with the top surface 404. Digital content 414 to 420 are shown along the four sides of the image of the cube 402 indicating that they may be associated with the corresponding side surface of the cube 402. The digital content 422 is shown with a line linking to the cube 402 indicating that it may be associated with the bottom surface of the cube 402.

Figure 10C:
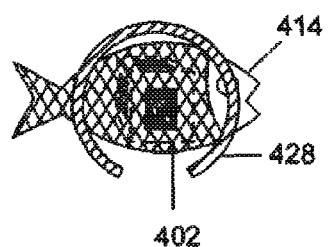

The user may rotate the cube 402 within the 3D input space 60 to present another surface to the camera 54 to select digital content. For example, if the user rotates the cube 402 by 90 degrees along the direction indicated by the arrow 426, the digital content 414 is then selected. As illustrated in FIG. 10C, an indicator 428 is shown and starts to grow with a predefined speed. The selection is confirmed when the indicator 428 grows to a full circle.

Figure 11A:
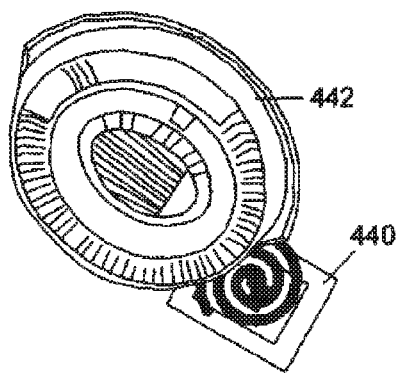
FIGS. 11A to 11C illustrate manipulation of a physical object in the 3D input space to erase digital content.
Figure 11B:
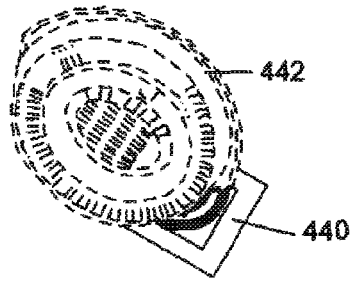
Figure 11C:
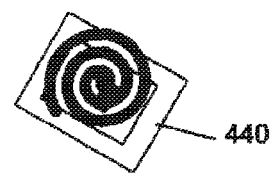

Various tools may be associated with markers for manipulating digital content. FIGS. 11A to 11C illustrate a "black hole" tool for erasing digital content displayed on the interactive surface 24. In FIG. 11A, when the marker associated with the "black hole" tool 440 is positioned within the 3D input space 60, the associated "black hole" tool appears in the displayed image. When the marker is manipulated in the 3D input space 60 to bring the "black hole" tool into the proximity of the digital content 442 with a distance less than a predefined threshold, after a threshold period of time has passed with the "black hole" tool 440 proximate the digital content, the computing device 28 recognizes an erase command. In response, the computing device 28 starts to shrink and fade-out the digital content 442, as shown in FIG. 11B, and, as shown in FIG. 11C, eventually erases the digital content from the image displayed on the interactive surface 24.

FIG. 12A shows a magnifying glass tool 460 having a magnifying window 462. When the marker associated with the magnifying glass tool 460 is positioned within the 3D input space 60, the associated magnifying glass tool 460 appears in the displayed image. When the marker is manipulated in the 3D input space 60 to bring the magnifying glass tool 460 into proximity of the digital content 464 and the magnifying window 462 is substantially overlapped with a portion of the digital content 464, the computing device 28 in response presents a magnified image of the digital content 464 in the magnifying window 462.

FIG. 12B shows a layer-view tool 480 having a layer-view window 482. The layer-view tool 480 is for use with digital content 484 that comprises multiple layered images. In this example, the digital content 484 comprises a second image 488 covered by a first image 486 so that the second image 488 is not displayed. When the marker associated with the layer-view tool 480 is positioned within the 3D input space 60 and manipulated such that the window 482 of the layer-view tool substantially overlaps with a portion of the digital content 484, the portion of the second image 488 overlapped with the layer-view window 482 is displayed by the computing device 28. If the digital content 484 comprises more than two layers, the user may apply a gesture, e.g., shaking gesture, to the layer-view tool 480 to see other layers. In some alternative embodiments, additional information of the digital content 484 may also be shown by using the layer-view tool 480.

In some embodiments, multiple markers may be used to manipulate the same digital content. FIG. 13 illustrates the interaction of digital content 500, such as for example a 3D model of a city, by using two markers 506 and 508. As will be described later, the marker 506 determines the viewable portion of the digital content 500, and the marker 508 representing a virtual camera, determines the detailed view of the digital content 500.

As shown in FIG. 13, the digital content 500 is zoomed to a user to a specified level so that only a detailed view of a portion of the digital content 500 is displayed in a detailed-view window 502 (e.g., a Notebook™ page or the entire interactive surface 24). A preview window 504 is overlapped with the detailed-view window 502 showing a full view of the digital content 500. A rectangular box 510 inside the preview window 504 indicates the viewable portion of the digital content 500. The digital content in the detailed-view window and the preview window may be different. For example, the preview window may show a 2D map of the content 500, while the detailed-view window may show a 3D view of the content 500.

The two markers 506 and 508 are used to interact with the digital content 500 through manipulations of the markers within the 3D input space 60. The x-y coordinates of the marker 506 determine the position of the rectangular box 510 in the preview window 504, and thus determine the viewable portion of the digital content 500. The marker 508 representing a virtual camera is shaped in such a way that it comprises a recognizable direction indicating the direction of the virtual camera view. The computing device 28 determines the direction of the marker 508 and the distance between the markers 506 and 608, which are then used to calculate the position and viewing direction of the virtual camera with respect to the digital content 500. An image 512 of the virtual camera is displayed in the preview window 504 at the calculated position, which indicates the direction the virtual camera is viewing. The image of the digital content 500 displayed in the detailed-view window 502 is also adjusted according to the position and the viewing direction of the virtual camera.

By moving the virtual camera marker 508 within the 3D input space 60, the user can freely move around within the viewable portion of the digital content 500 and view perspectives thereof. The user may also move the marker 506 within the 3D input space 60 to select another portion of the digital content for viewing via the virtual camera.

The use of physical markers in the 3D input space 60 provides users great flexibility to manipulate digital content. As described above, the computing device 28 detects the movement, rotation and tilting of a marker and then determines the interaction to be applied to the associated digital content. In some embodiments, the interaction applied may change the position and/or angle of digital content, or replace digital content with alternative digital content. In some other embodiments, the action of a marker may change some parameters of the associated digital content.

For example, in some embodiments, the computing device 28 may interpret the rotation of a cube-shaped marker with respect to its z-axis (see FIG. 14A) as a command changing the length of the associated digital content, and may interpret the rotation of the marker with respect to its x-axis as a command changing the color mix of the digital content. Shown in FIG. 14B, digital content 522 is associated with a marker in the form of a cube 520 (the marker patterns on the cube are not shown). When the user rotates the cube about its z-axis as indicated by the arrow 524 within the 3D input space 60, as shown in FIG. 14C, the length of the digital content 522 is increased. Rotating the cube 624 in the opposite direction decreases the length of the digital content.

FIG. 14C shows digital content 532 associated with a cube 530 (the marker patterns on the cube are again not shown) that is filled with two colors 534 and 536, where the color 536 fills in more area than the color 534. The user rotates the cube about its x-axis as indicated by the arrow 538 within the 3D input space 60. As a result shown in FIG. 14E, the area filled by the color 534 is increased and the area filled by the color 536 is decreased. Rotating the cube 530 in the opposite direction decreases the area filled by the cube 534 and increases the area filled by colour 536

FIG. 15A shows digital content 560 in the form of an e-book that is associated with two cubes 562 and 564, where the association is visually indicated by the links 566 and 568, respectively. The user may rotate the markers 562 and 564 to the left and right as indicated by the arrows 570 and 572, respectively within the 3D input space 60 to manipulate the digital content 560 (i.e., to open the e-book 560 and leaf through its pages).

FIG. 16A shows digital content 600 in the form of a cylinder that is associated with two cubes 602 and 604. The user may rotate the cubes oppositely with respect to the z-axis and, at the same time, move the cubes 602 and 604 towards each other to the new positions 610 and 612, as indicated by the arrows 606 and 608, respectively, within the 3D input space 60 to manipulate the digital content 600. As shown in FIG. 16B, in response to cube movement within the 3D input space 60, the shape of the digital content 600 is changed, i.e., twisted towards the new positions 610 and 612.

FIG. 17A shows digital content 640 in the form of a stadium that is associated with two cubes 642 and 644. The user may move the cubes 642 and 644 away from each other within the 3D input space 60 to manipulate the digital content 640. As shown in FIG. 16B, in response to cube movement within the 3D input space 60, the digital content 640 is enlarged.

While manipulating the digital content by using associated markers, rules may be applied to reject invalid operations based on the characteristics of the digital content. For example, in FIG. 18A, where digital content 660 in the form of a stadium is associated with two cubes 662 and 664, the characteristics of the stadium 660 do not allow it to be twisted. Therefore, when the user moves the cubes 662 and 664 away from each other and, at the same time, rotates them oppositely with respect to the z-axis, within the 3D input space 60, as indicated by the arrows 666 and 668, respectively, the rotations of the markers are ignored. As shown in FIG. 18B, the stadium 640 is thus enlarged without twisting.

FIG. 19A shows another example where digital content 700 in the form of a globe is associated with a cube 702. According to the characteristics of the globe 700, only the rotation of the cube with respect to z-axis is accepted, which results in the globe rotating along its longitude. When the user rotates the cube imperfectly with the rotation axis not parallel to the z-axis, e.g., as indicated by the arrow 704, the computing device 28 detects the rotation of the cube 702, and projects the rotation to the x-y plane to obtain the rotation vector with respect to the z-axis. Then, the computing device 28 applies the projected rotation vector to the digital content 700. As shown in FIG. 19B, although the cube 702 is rotated and tilted within the 3D input space 60, the digital content is rotated without tilting.

In some embodiments, the computing device 28 adapts the image of the digital content to the motion of the marker associated therewith. The digital content may comprise a set of predefined images or may be associated with a model such that the image of the digital content may be changed according to the rules of the model. When the marker associated with such digital content is manipulated in the 3D input space 60, the computing device 28 detects the motion of the marker and calculates parameters such as for example the velocity, acceleration, rotating/tilting angles, path, etc., as described above, and updates the image of the digital content to follow the motion of the marker in real-time. When updating the image of the digital content, the computing device 28 also modifies the image of the digital content by replacing the current image with another image from the set of images, or by replacing the current image with an image generated according to the rules of the associated model. The modification of the image of the digital content is based on the motion of the marker.

Figure 20:
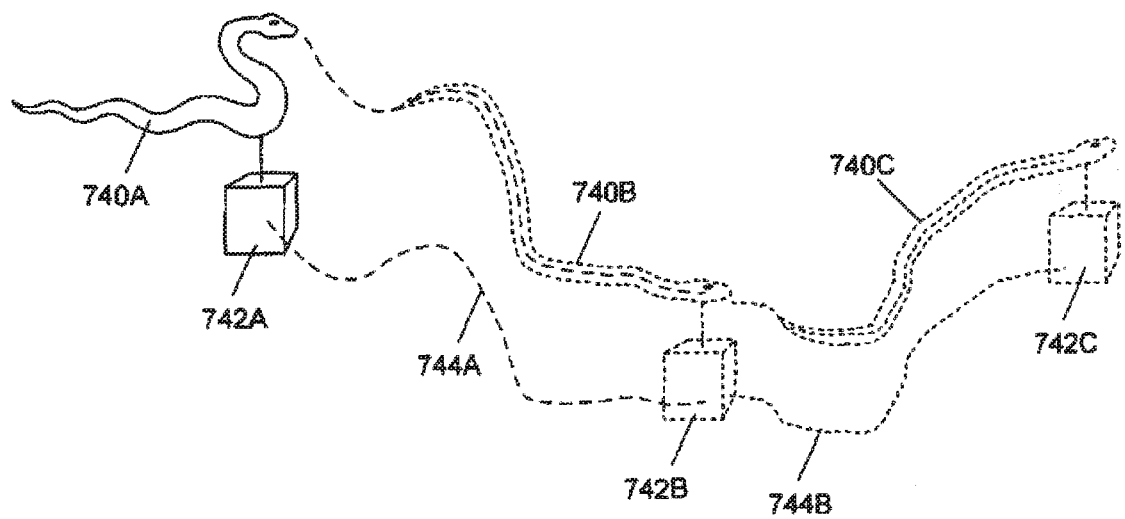
FIGS. 20 and 21 illustrate an animation method for manipulating digital content based on the motion of a physical object in the 3D input space.

FIG. 20 shows an example of modifying the image of the digital content based the motion of the marker. A marker in the form of a cube placed at position 742A is associated with 3D digital content 740A in the form of a snake. The user moves the cube from the position 742A to another place 740B in the 3D input space 60. The computing device 28 detects the movement of the cube, and calculates the path 744A between the two positions 742A and 742B. Then, the computing device 28 moves the snake 740A to a place corresponding to the marker's current position 740B, and modifies the image of the snake 740A to the image 740B such that the shape of the snake matches the path 744A. When the user moves the cube to position 742C, the computing device 28 again calculates the path 744B, and then moves the snake to a position corresponding to the marker's position 742C and modifies the image of the snake to image 740C such that the image 740C matches the path 744B.

Figure 21:
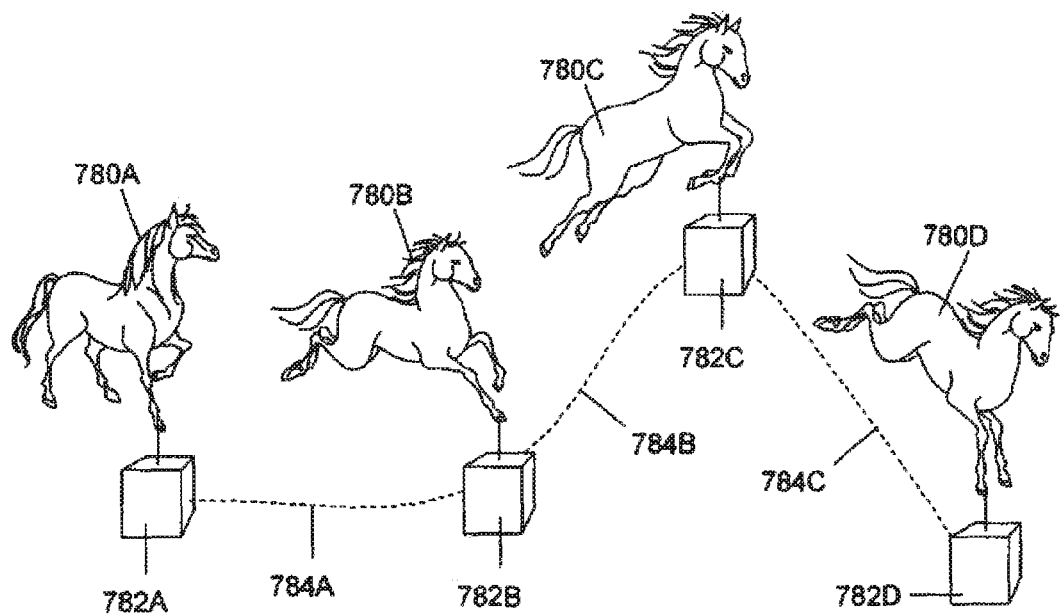

In FIG. 21, 3D digital content 780A in the form of a horse is associated with a cube at the position 782A. Because the cube is stationary, the image of the digital content shows the image of a standing horse. When the user moves the cube to a second position 782B within the 3D input space 60, the computing device 28 detects the movement of the cube, and calculates parameters of the marker, including the velocity of the marker and the path 784A. Then, the computing device 28 moves the horse to the position corresponding to the marker's current position 782B, and, because the velocity of the marker is not zero, updates the image of the digital content to a running horse 780B.

The user then moves the cube to a third position 782C which is higher than the previous position 782B within the 3D input space 60, the computing device 28 detects the movement of the cube, and calculates parameters of the marker, including the velocity of the marker and the path 784B. The velocity, which is a vector in 3D space, indicates that the cube is moving upward with a high speed. Therefore, the computing device 28 moves the horse to the position corresponding to the marker's current position 782C, and updates the image of the digital content to a horse with a pose of jumping up 780C.

The user then moves the cube to a fourth position 782D which is lower than the previous position 782C within the 3D input space 60. The computing device 28 detects the movement of the cube, and calculates parameters of the marker, including the velocity of the marker and the path 784C. The velocity indicates that the cube is moving downward with a high speed. Therefore, the computing device 28 moves the horse to the position corresponding to the marker's current position 782D, and updates the image of the digital content to a horse with a pose of jumping down 780D.

In some embodiments, the interactive input system 20 may be used in education, e.g., teaching physics or asking students to answer questions. FIGS. 22A to 22C show digital content 806 in the form of a spring coil associated with two markers 802 and 804. In FIG. 22A, the user moves the markers 802 and 804 towards each other within the 3D input space 60, as indicated by the arrows 808 and 810, respectively. In response, the digital content 806 is updated by the computing device 28 to show an image of a compressed spring coil, together with two arrows 812 and 814 at each end of the spring coil 806, respectively, to indicate the force generated in the compressed spring coil 806.

In FIG. 22B, the user manipulates the markers 802 and 804 to bend the spring coil 806, using the method described above. Then, the computing device 28 updates the image of the digital content 806 to show a bent spring coil, and shows four arrows 820 to 826 to indicate the force generated in the spring coil 806.

In FIG. 22C, the user moves the marker 802, as the arrow 840 indicates, to twist the spring coil 806. Then, the computing device 28 updates the image of the digital content 806 to show a twisted spring coil, and shows six arrows 842 to 852 to indicate the force generated in the spring coil 806.

FIG. 23 shows two cubes 862 and 864. Each surface of each cube comprises a marker pattern (not shown), and is associated with a word, e.g., the words 866 to 872 as shown in FIG. 23. A number of words 860 are also displayed on the interactive surface 24. The user is required to rotate the cubes to certain positions within the 3D input space 60 such that the words associated with the surfaces of the cubes facing the camera 54 match the words 866 to 872 in the prescribed order. The computing device 28 in this case ignores translations of the cubes 862 and 842, but processes rotations thereof. After a threshold time period has passed with the cubes positioned as described above, the computing device 28 determines whether the user's answer is correct or not. An audio or video indication of correctness is then provided.

Figure 24A:
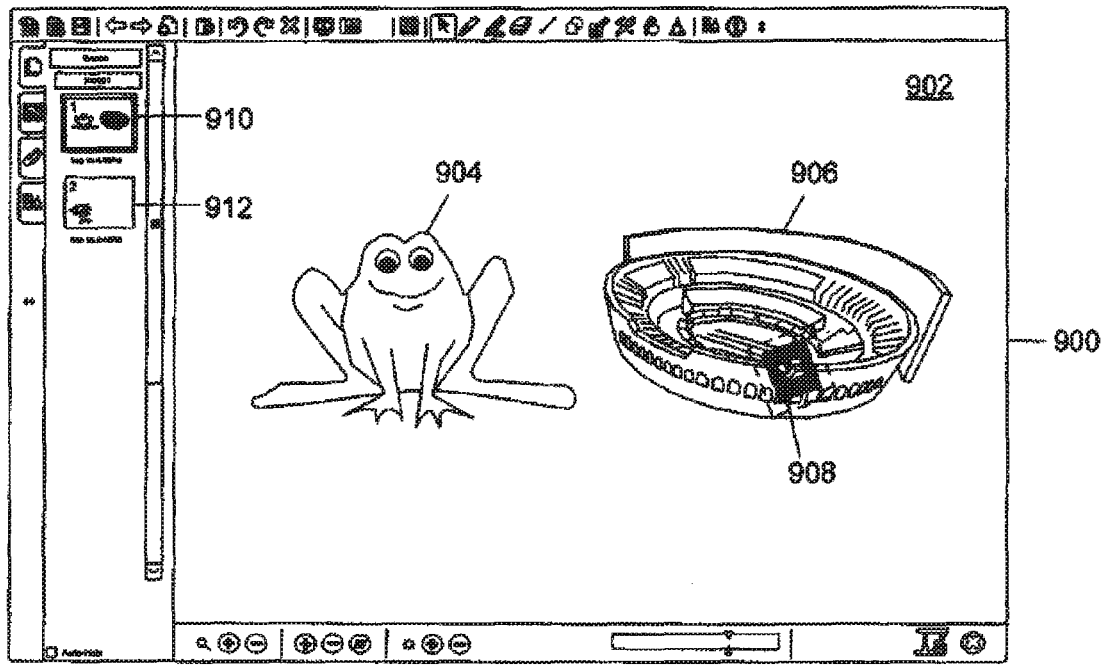
FIGS. 24A and 24B illustrate a method of switching a content page in the mixed reality mode.
Figure 24B:
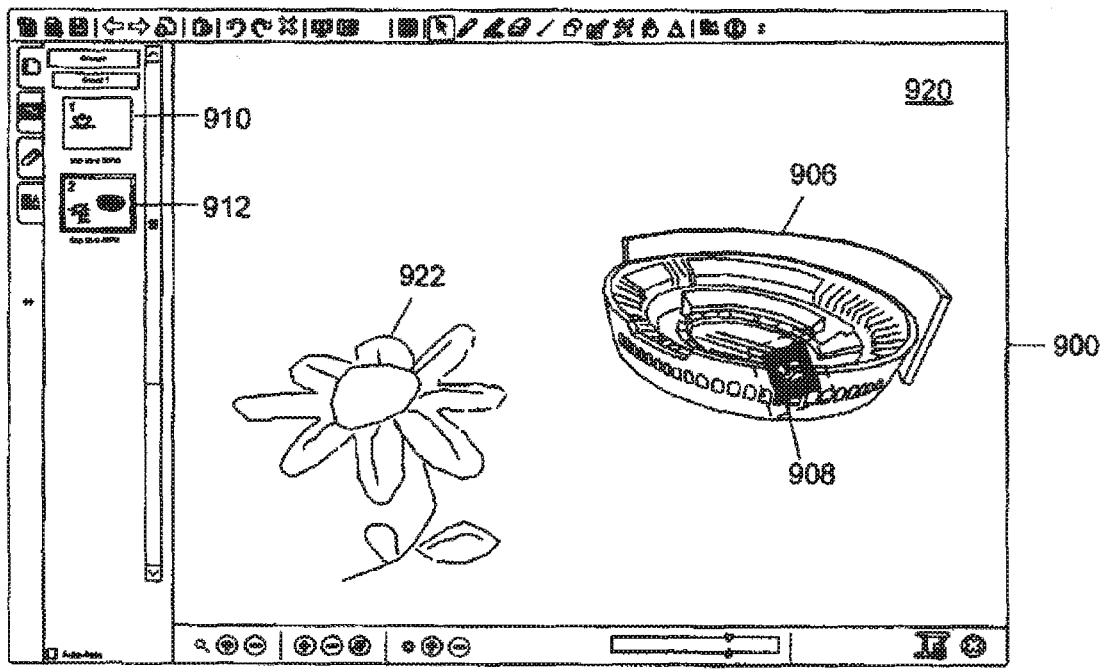

The interactive input system allows the user to switch to another SMART Notebook™ page while the MR mode is turned on. FIGS. 24A and 24B show a SMART Notebook™ program window 900 that comprises two pages 902 and 920 associated with page thumbnails 910 and 912, respectively. In FIG. 24A, page 902 is the current page, which is indicated by the thick border of page thumbnail 910. The current page 902 is in MR mode. The MR window, in the form of a transparent window, is overlaid on a SMART Notebook™ page that comprises two digital contents 904 and 906. The digital content 904 is not associated with a marker, and the digital content 906 is selected by the marker 908.

The user may select the page thumbnail 912 to switch to page 920. As shown in FIG. 24B, the content of the page 920 is then shown on the interactive surface 24. The page thumbnail 910 is changed to a thin border, and the page thumbnail 912 is changed to a thick border. After page 920 becomes the current page, it is automatically conditioned to the MR mode, and the MR window is overlaid thereon. The digital content in page 920, e.g., the content 922, are brought into the MR window. The digital content not associated with any marker when page 902 was the current page are left therein after the current page is switched to page 920. The digital content associated with or selected by markers when page 902 was the current page are moved to page 920 with the MR window. For example, while the digital content 904 is left in page 902, the digital content 906, which is selected by the marker 908, is moved to page 920 with the MR window.

Those skilled in the art will appreciate that various alternative embodiments are readily available. Although the interactive board 22 is described as being mounted on a vertical support surface, those of skill in the art will appreciate that the interactive board may be supported on a stand or other suitable framework or suspended from overhead structure. Of course interactive boards employing other machine vision configurations, analog resistive, electromagnet, capacitive, acoustic or other technologies to register pointer input may be employed. Also, rather than taking a vertical configuration, the interactive board may be in the form of a touch table comprising a horizontal oriented interactive surface.

In some alternative embodiments, the interactive input system may comprise no 2D input device. In this case, a projector 38 may be used with a display surface (e.g., a projection screen) to display images output by the computing device 28.

Although in above embodiments, fade-in/fade-out are used as the transition effects, those of skill in the art will appreciate that other transition effects may be employed. For example, instead of using a fade-in effect, a zoom-in effect may be used, with which digital content is brought onto the display with an effect of scaling up from a tiny size to its full size. Instead of using a fade-out effect, a zoom-out effect may be used, with which digital content is removed from the display by scaling it from its current size to a tiny size and then disappear.

Although in above embodiments, the 3D input space is defined as a pyramidal frustum shape, those of skill in the art will appreciate that the 3D input space may take other 3D shapes such as for example, a cube, a cylinder or a sphere. In this case, the planes are also properly defined according to the shape of the 3D interactive space, and may not necessarily be a flat plane.

Those skilled in the art will appreciate that, in some alternative embodiments, while a pattern is recognized and the associated digital content is inserted into the image presented on the interactive surface, when a pattern is recognized the associated digital content may be deleted from the image presented on the interactive surface.

Those of skill in the art will appreciate that the above description of the toolbar for controlling the MR environment is for illustrative purpose only. Other functions are also available, and the toolbar may comprise more or less functions than the above description. In some alternative embodiments, the camera icon 206 may take the form of a button that allows the user to switch between the MR mode and a normal camera mode in which images captured by the camera 54 are shown in the Notebook™ program window without entering the MR mode. In other alternative embodiments, the icon 206 changes between a camera icon and a mixed reality marker pattern icon, to indicate to the user the current camera mode (the normal camera mode or the MR mode).

In some alternative embodiments, a line segment may or may not be used to connect the 3D content to the marker, to show the user that the association has been created.

In some alternative embodiments, the user can be interacting with any application running on the computing device 28 before entering into the mixed reality mode. Once the marker pattern has been recognized by the computing device 28, a transition to the mixed reality mode is activated and displayed to the user. An automatic URL may be activated upon recognition of a mixed reality marker.

In some alternative embodiments, the cube-shaped marker employing LCD panels can have multiple buttons for additional functionality. Additional functionality can include for example an on/off, select content, disassociate content, etc. function. Those of skill in the art will also appreciate that not all LCD panels of the cube-shaped marker have to be active when the button is pushed. The top facing LCD panel of the cube-shaped marker can be active while the other LCD panels remain markerless.

In some alternative embodiments, the LCD panels will begin in an "off" state. By moving the LCD panels within the defined proximity of 3D content, and triggering the button to turn on the LCD panels, the 3D content will become associated with the marker pattern displayed on the top LCD panel. When the LCD panel is turned "off", the marker will become disassociated with the 3D content.

Although in above description, a menu comprising a set of predefined digital content may be opened by the manipulation of a physical object, those skilled in the art will appreciate that other types of menus may also be opened by the manipulation of a physical object. For example, a menu comprising a set of text-based menu items may be opened, and a menu item may be selected by the manipulation of a physical object.

Although embodiments have been described above with reference to the accompanying drawings, those of skill in the art will appreciate that variations and modifications may be made without departing from the scope thereof as defined by the appended claims.

What is claimed is:

1. An interactive input system comprising:
   computing structure; and
   an input device detecting at least one electronic device displaying a recognizable pattern within a three-dimensional (3D) input space and providing output to said computing structure, wherein said computing structure processes the output of the input device to:
   recognize the pattern displayed by the at least one electronic device in the 3D input space;
   detect the state of the at least one electronic device; and
   modify image data representing at least digital content associated with the displayed pattern and the displayed pattern by applying a transition to the digital content associated with the displayed pattern based on the detected state of the at least one electronic device; and
   a display coupled to said computing structure, the display presenting an image based on said image data,
   wherein when the detected state of the at least one electronic device signifies that a new recognizable pattern is visible thereon and the new recognizable pattern is maintained in the 3D input space within a threshold distance of a location corresponding to digital content in the image presented on the display for a threshold time period, the image data is further modified to associate the digital content with the new recognizable pattern, the associated digital content appearing in the image presented on the display using a visual effect.

2. The interactive input system of claim 1 wherein said input device is a camera device capturing images of said 3D input space.

3. The interactive input system of claim 1 wherein said recognizable pattern is associated with at least one secondary recognizable pattern located at predetermined positions on said at least one electronic device.

4. The interactive input system of claim 3 wherein said at least one electronic device has a generally cuboid-shape and comprises at least one secondary recognizable pattern on each face of the electronic device.

5. The interactive input system of claim 4 wherein the at least one secondary recognizable pattern is located adjacent each corner of the electronic device.

6. The interactive input system of claim 5 wherein the at least one electronic device comprises processing structure, memory for storing instructions executable by the processing structure, and data representing at least one recognizable pattern, and a display for presenting at least one recognizable pattern.

7. The interactive input system of claim 6 wherein said data represents a library of recognizable patterns.

8. The interactive input system of claim 7 wherein said data is downloadable by the processing structure of said electronic device from a remote source.

9. The interactive input system of claim 8 wherein said at least one electronic device is an ebook.

10. The interactive input system of claim 1 wherein said at least one electronic device has a plurality of display panels for displaying recognizable patterns.

11. The interactive input system of claim 10 wherein said at least one electronic device is a cube comprising display panels on faces thereof.

12. The interactive input system of claim 11 wherein said display panels are liquid crystal display panels.

13. The interactive input system of claim 1 wherein said at least one electronic device comprises a liquid crystal display panel.

14. The interactive input system of claim 1 wherein said display is an interactive surface.

15. The interactive input system of claim 1 wherein the computing structure processes the output of the input device to detect at least one of orientation, position and movement of the at least one electronic device in the 3D input space.

16. The interactive input system of claim 1 wherein when the detected state of the at least one electronic device signifies removal of a previously recognizable pattern thereon, the image data is modified to remove associated digital content therefrom, the associated digital content disappearing from the image using a different visual effect.

17. The interactive input system of claim 1 wherein the visual effect is a fade-in visual effect or a scale-up visual effect.

18. The interactive input system of claim 16 wherein the different visual effect is a fade-out visual effect or a scale-down visual effect.

19. The interactive input system of claim 1 wherein the computing structure further processes the output of the input device to detect gestures made using said at least one electronic device.

20. The interactive input system of claim 19 wherein said computing structure manipulates digital content associated with the at least one electronic device in response to detected gestures.

* * * * *